(12) United States Patent
Inagaki et al.

(10) Patent No.: US 8,779,277 B2
(45) Date of Patent: Jul. 15, 2014

(54) LIGHT ENERGY CONVERSION MATERIAL

(75) Inventors: Shinji Inagaki, Nagoya (JP); Masao Aoki, Rodenbach (DE); Ken-ichi Yamanaka, Aichi-gun (JP); Kiyotaka Nakajima, Yamato (JP); Masataka Ohashi, Nagoya (JP)

(73) Assignee: Kabushiki Kaisha Toyota Chuo Kenkyusho, Aichi (JP)

( * ) Notice: Subject to any disclaimer, the term of this patent is extended or adjusted under 35 U.S.C. 154(b) by 229 days.

(21) Appl. No.: 13/366,009

(22) Filed: Feb. 3, 2012

(65) Prior Publication Data

US 2012/0181163 A1 Jul. 19, 2012

Related U.S. Application Data

(62) Division of application No. 11/892,776, filed on Aug. 27, 2007, now Pat. No. 8,247,680.

(30) Foreign Application Priority Data

Aug. 31, 2006 (JP) .................................. 2006-235638
Jul. 20, 2007 (JP) .................................. 2007-189886

(51) Int. Cl.
*H01G 9/20* (2006.01)

(52) U.S. Cl.
CPC .............. *H01G 9/20* (2013.01); *H01G 9/2027* (2013.01)
USPC ....................................................... 136/243

(58) Field of Classification Search
CPC ............................... H01G 9/20; H01G 9/2027
USPC ....................................................... 136/243
See application file for complete search history.

(56) References Cited

U.S. PATENT DOCUMENTS

| 6,248,686 | B1 | 6/2001 | Inagaki et al. |
| 2003/0019517 | A1 | 1/2003 | McFarland |
| 2003/0155583 | A1 | 8/2003 | Matsui et al. |
| 2003/0175569 | A1 | 9/2003 | Inagaki et al. |
| 2007/0202353 | A1 | 8/2007 | Inagaki et al. |
| 2007/0221884 | A1 | 9/2007 | Hoppe et al. |

FOREIGN PATENT DOCUMENTS

| EP | 1 282 189 A1 | 2/2003 |
| JP | A-2002-110260 | 4/2002 |
| JP | A-2006-158359 | 6/2006 |
| JP | A-2006-310380 | 11/2006 |
| WO | WO 2005/097944 | 10/2005 |
| WO | WO 2006/008239 | 1/2006 |

OTHER PUBLICATIONS

J. Lakowicz, "Principles of Fluorescence Spectroscopy", Chapter 13: Energy Transfer, $2^{nd}$ ed. pp. 367-368 (1999).
Minoofar P. et al., "Placement and Characterization of Pairs of Luminescent Molecules in Spatially Separated Regions of Nanostructured Thin Films", 2002, J. Am. Chem. Soc., vol. 124, pp. 14388-14396.

*Primary Examiner* — Jonathan Johnson
*Assistant Examiner* — Allison Bourke
(74) *Attorney, Agent, or Firm* — Oliff PLC

(57) ABSTRACT

A method of transferring electrons with a light energy conversion material is described. The material includes a silica porous material having silicon atoms chemically bonded with an organic group that is an electron donor in a skeleton thereof, and an electron acceptor disposed in at least one portion among a pore, the skeleton and the outer circumference of the porous material. The method includes absorbing light energy by the organic group and transferring electrons excited by the light energy to the electron acceptor.

7 Claims, 36 Drawing Sheets
(1 of 36 Drawing Sheet(s) Filed in Color)

LIGHT ENERGY CONVERSION MATERIAL

The present application is a divisional application of U.S. patent application Ser. No. 11/892,776 filed Aug. 27, 2007. The entire disclosure of the prior application is incorporated herein by reference.

BACKGROUND OF THE INVENTION

1. Field of the Invention

The present invention relates to a light energy conversion material.

2. Related Background Art

Studies on a light energy conversion material have so far been made. The light energy conversion material utilizes a photo-excited electron transfer reaction in which an electron is transferred from an electron donor to an electron acceptor in accordance with the absorption of light energy.

For example, Japanese Unexamined Patent Application Publication No. 2002-110260 (JP 2002-110260 A) discloses a light energy convers ion material including a photoactive pigment, an electron donor, an electron acceptor, and a porous material having a pore with a pore wall thickness of 2 nm or less. The photoactive pigment is disposed inside or outside the pore. At least one of the electron donor and the electron acceptor is disposed inside the pore. Additionally, the electron donor and the electron acceptor are not disposed directly adjacent to each other, but are separated by the pore wall.

However, in the conventional light energy conversion material as described in JP 2002-110260 A, it is necessary to introduce a large amount of the electron donor in the pore space to achieve the effect sufficiently. On the other hand, since the photoactive pigment and the electron acceptor were also disposed in the pore space, it is spatially difficult to introduce a sufficiently large amount of the electron donor in the pore. Consequently, the introduced amount of the electron donor is not always sufficient. Even if the pore space is filled with the sufficient amount of the photoactive substance and the electronic substance in the light energy conversion material, a chemical energy conversion reaction is not always sufficiently advanced using the pore space as a reaction field. Thus the energy conversion efficiency is not always sufficient.

On the other hand, with respect to a thin film in which luminescent molecules are introduced, a method of making a mesostructured inorganic silicate thin film in which a pair of luminescent molecules such as a ruthenium complex and pyrene are introduced in the spatially separated region is disclosed (refer to "Placement and Characterization of Pairs of Luminescent Molecules in Spatially Separated Regions of Nanostructured Thin Films" in J. AM. CHEM. SOC., 2002, 124, 14388-14396). With respect to a luminescent material, a silica porous material containing a specific organic group showing fluorescence or phosphorescence is disclosed in International Publication No. WO2005/097944. However, it is not suggested to employ such a luminescent material and the like in the light energy conversion material.

SUMMARY OF THE INVENTION

The present invention is made in consideration of the problems of the prior art. An object of the present invention is to provide a light energy conversion material which can advance a light energy conversion reaction with a high efficiency, resulting in the significant improvement in the light energy conversion efficiency, and, further, which can improve the physical stabilities of an electron donor and an electron acceptor to give the light conversion material a sufficient durability.

The present inventors have devoted themselves to keen studies so as to achieve the above object. As a result, the present inventors have discovered the following facts, and then completed the present invention. The light energy conversion material is obtained by using a porous material including an electron donor in a skeleton thereof, and an electron acceptor is disposed in at least one portion among a pore, the skeleton and the outer circumference of the porous material. The light energy conversion material can surprisingly advance a light energy conversion reaction with a high efficiency, resulting in the significant improvement in the light energy conversion efficiency, and further can improve the physical stabilities of the electron donor and the electron acceptor to give the light conversion material a sufficient durability.

In other words, the light energy conversion material of the present invention is a light energy conversion material comprising: a porous material including an electron donor in a skeleton thereof; and an electron acceptor disposed in at least one portion among a pore, the skeleton and the outer circumference of the porous material.

The porous material according to the present invention, which includes the electron donor in the skeleton thereof, is preferably a silica porous material containing an organic group. The organic group is preferably at least one kind selected from the group consisting of an aromatic compound, a peri-condensed aromatic compound, a polycyclic aromatic compound, a nitrogen-containing aromatic compound, a sulfur-containing aromatic compound, an aromatic vinyl polymer, an aromatic amine compound, an alkyl amine compound, a nitro compound, a metal complex having a nitrogen-containing organic ligand, a metal complex having a cyclic ligand, a metal complex salt, and a derivative thereof.

The porous material according to the present invention preferably has a periodic structure with an interval of 5 nm or less based on the regular arrangement of the organic group.

The porous material according to the present invention preferably has the pore with a central pore diameter of 1 nm to 30 nm.

Furthermore, the porous material according to the present invention more preferably has one or more peaks at a diffraction angle corresponding to a d value of 1 nm or more in an X-ray diffraction pattern.

The electron acceptor according to the present invention is preferably at least one kind selected from the group consisting of a quinone compound, an aromatic compound having a vinyl group, an aromatic compound having a cyano group, an aromatic compound having a nitro group, a nitrogen-containing aromatic compound, an organic compound having a dicyanomethylene group, a molecular metal complex containing an organic compound having a dicyanomethylene group as a ligand, an organic compound having a cyanoimino group, a molecular metal complex containing an organic compound having a cyanoimino group as a ligand, fullerene, a carbon nanotube, a metal complex having a nitrogen-containing organic ligand, a metal complex having a cyclic ligand, a metal complex salt, a metal ion, a metal oxide, and a derivative thereof.

Note that, the reasons why the above object is achieved by use of the light energy conversion material of the present invention are not necessarily defined, but the present inventors estimate the reasons as follows. Specifically, the improvement in the light energy absorption efficiency and the improvement in electron transfer efficiency from the electron donor to the electron acceptor are important to improve the light energy conversion efficiency in the light energy conversion material. In order to improve the electron transfer efficiency, it is important to form the state where the pair of the electron donor and the electron acceptor is disposed in a high density. On the one hand, it is possible to disperse a high concentration of the compounds of both the electron donor and the electron acceptor in a solution. On the other hand, when the solid material which is practically used as a light energy conversion material is to be used, it is difficult to form the state where the pair of the electron donor and the electron acceptor is disposed in a high density.

For these reasons, the porous material including the electron donor in the skeleton is used in the present invention. Accordingly, many of the electron donors are exposed to the surface of the pore of the porous material. When the electron acceptors are disposed on the surface of the porous material, the state where the pair of the electron donor and the electron acceptor is disposed in a high density is formed. Therefore, when the light energy is absorbed, the occurrence of electrons and holes by the charge separation is accelerated. As a result, the electron transfer efficiency is improved, and thereby the light energy conversion efficiency is significantly improved. The porous material including the electron donor in the skeleton has a high light-energy-absorption efficiency because the electron donors are present in the skeleton in a high density. Moreover, the energy excited by the absorption of the light energy can be transferred in the skeleton of the porous material, and thereby the electron transfer efficiency to the electron acceptor is improved. Furthermore, such a transfer efficiency of the excited energy in the skeleton depends on the structure of the porous material. Therefore, the use of the porous material having a more regularly arranged structure allows the light energy conversion efficiency to be improved. Still furthermore, the physical stabilities of the electron donor and the electron acceptor are improved by fixing the electron acceptor in the narrow space such as the pore and the skeleton of the porous material including the electron donor in the skeleton. As a result, the durability of the light conversion material is improved.

The present invention makes it possible to provide a light energy conversion material which can advance a light energy conversion reaction with a high efficiency, resulting in the significant improvement in the light energy conversion efficiency, and, further, which can improve the physical stabilities of an electron donor and an electron acceptor to give the light conversion material a sufficient durability.

BRIEF DESCRIPTION OF THE DRAWINGS

The patent application contains at least one drawing executed in color. Copies of this patent or patent application publication with color drawing(s) will be provided by the Office upon request and payment of the necessary fee.

DETAILED DESCRIPTION OF THE PREFERRED EMBODIMENTS

Figure 1:
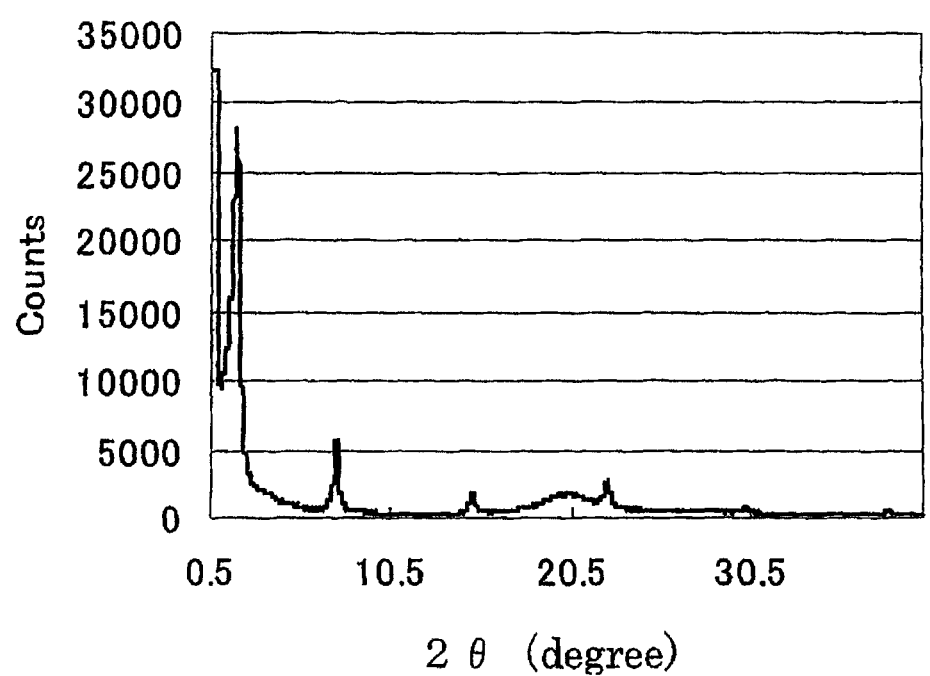
FIG. 1 is a graph showing an XRD pattern of crystalline powders of BiPh-HMM obtained in Synthesis example 1.

The present invention will hereinafter be described in detail according to the preferred embodiments.

A light energy conversion material of the present invention includes: a porous material having an electron donor in a skeleton thereof; and an electron acceptor disposed in at least one portion among a pore, the skeleton and the outer circumference of the porous material.

First, the porous material according to the present invention will be described. For such a porous material, it is only necessary to include an electron donor in the skeleton thereof, and is not particularly limited. A silica porous material containing an organic group, and a silica porous material such as FSM and MCM which are treated so as to function as an electron donor can be used as the porous material. As the porous material including an electron donor in the skeleton, a silica porous material containing an organic group is preferable.

Such a silica porous material containing an organic group includes a silica porous material made of a polymer of organic silicon compounds represented by, for example, the following general formula (1):

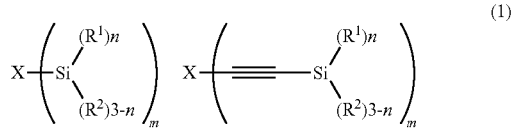

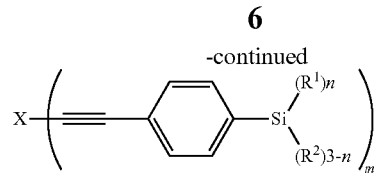

In the general formula (1), X is an organic group, which functions as an electron donor. Here, the transfer of photoelectrons caused by the electron donor and the electron acceptor to be described below will be described.

The photoelectron transfer is the intermolecular transfer of electrons which occurs between a molecule X (X) and a molecule Y (Y) dispersed in a solution or a solid by the irradiation. For the occurrence of photoelectron transfer, the lowest unoccupied molecular orbit (LUMO) or highest occupied molecular orbit (HOMO) of Y needs to be present between the energy levels of the HOMO and LUMO of photoexcited X (X*). When the LUMO of Y is present between the energy levels of the HOMO-LUMO of X*, the electron is transferred from X* to Y. In the meanwhile, when the HOMO of Y is present between the energy levels of the HOMO-LUMO of X* the electron is transferred from Y to X. In the photoelectron transfer process, the electron is transferred from an electron donating molecule (electron donor: D) to an electron accepting molecule (electron acceptor: A) to form a charge separation state where a positive charge and a negative charge are separated from each other in the system.

Furthermore, from the point of view that electrons are easily supplied, the organic group (electron donor) which functions as the electron donor is preferably at least one kind selected from the group consisting of an aromatic compound, a peri-condensed aromatic compound, a polycyclic aromatic compound, a nitrogen-containing aromatic compound, a sulfur-containing aromatic compound, an aromatic vinyl polymer, an aromatic amine compound, an alkyl amine compound, a nitro compound, a metal complex having a nitrogen-containing organic ligand, a metal complex having a cyclic ligand, a metal complex salt, and a derivative thereof. Above all, particularly preferable are 1,1-bi-2-naphthol, 1,3-di(N-carvazolyl)propane (DCzPr), 1,4-di(N-carvazolyl)butane (DCzBu), 1,4-diazabicyclo[2,2,2]octane, 2,3-dihydroxynaphthol, 2,7-dihydroxy-naphthol, 2-naphthol, Cr(CN)$_6^{3-}$ Cu(2,9-diphenyl-1,10-phenanthroline)$^{2+}$, di(N-carvazolyl) methane (DCzMe), Eu$^{2+}$, Fe (CN)$_6^{4-}$, Fe$^{2+}$, meso-2,4-di(N-carvazolyl)pentane (m-DCzPe), Mg(phthalocyanine)$^{4+}$, N,N,N',N'-tetramethyl-p-phenylenediamine, N,N,N',N'-tetramethylbenzidine, N,N-diethylaniline, N,N-dimethylaniline, N-ethyl-carbazole (EtCz), Pt$_2$ (P$_2$O$_5$)$_4$H$_8^{4-}$, ReCl$_8^{2-}$, Rh$_2$(1,3-diisocyanopropane)$_4^{2+}$, Ru(2,2'-bipyridine)$_3^{2-}$, Tetrakis(dimethylamino)ethylene (TDAE), trans-1,2-di(N-carvazolyl)cyclobutane (DCzCBu), Zn(tetra(N-methylpyridinium)porphyrin)$^{4+}$, a Zn porphyrin complex, Zn(tetraphenylporphyrin), Zn(octaethylporphyrin), a Zn phthalocyanine complex, anthracene, indene, oxadiazole, oxazole, quadricyclane, diazabicyclooctane, diphenylethylene, triethylamine, triphenylmethane, trimethoxybenzene, naphthalene, norbornadiene, hydrazone, pyrene, phenanthrene, phenothiazine, perylene, methoxynaphthalene, and the like.

In the general formula (1), R$^1$ is at least one selected from the group consisting of a lower alkoxy group {preferably an alkoxy group (RO—) having a carbon number of 1 to 5}, a hydroxyl group (—OH), an allyl group (CH$_2$—CH—CH$_2$—), an ester group {preferably an ester group (RCOO—) having a carbon number of 1 to 5}, and a halogen atom (chlorine atom, fluorine atom, bromine atom, iodine atom). In particular, the lower alkoxy group and/or the hydroxyl group are preferable from the point of view that the condensation reaction is easily controlled.

Incidentally, when a number of $R^1$s are present in the same molecule, $R^1$s may be either the same or different.

Moreover, in the general formula (1), $R^2$ is at least one selected from the group consisting of a lower alkyl group {preferably an alkyl group (R—) having a carbon number of 1 to 5} and a hydrogen atom. Incidentally, when a number of $R^2$s are present in the same molecule, $R^2$s may be the same or different.

Furthermore, n and (3-n) in the general formula (1) are respectively the number of $R^1$ and $R^2$ bound to silicon atom (Si). Such n is an integer of 1 to 3, and is particularly preferably 3 from the point of view that the structure formed after condensation is stable. m in the general formula (1) is the number of the silicon atom (Si) bound to the organic group (X). Such m is an integer of 1 to 4, and is particularly preferably 2 from the point of view that a stable siloxane network is easily formed.

The porous material formed by polymerizing the organic silicon compounds represented by the general formula (1) may be formed either by polymerizing one kind of a monomer of the organic silicon compounds represented by the general formula (1) or by copolymerizing two or more kinds of the monomers. In addition, such a porous material may be formed (i) by copolymerizing the organic silicon compound represented by the general formula (1) and an organic silicon compound with other organic group than the above-described organic groups in place of X in the general formula (1), or (ii) by copolymerizing the organic silicon compound represented by the general formula (1) and the other monomer. The organic silicon compound represented by the general formula (1) and the monomer supplied for the copolymerization as necessary are hereinafter collectively named "monomer".

Such other organic group includes an organic group having a valence of one or more formed by removing one or more hydrogen atoms from a hydrocarbon such as alkane, alkene, alkyne, and cycloalkane, but is not limited to these. The other organic group may also have an amide group, an amino group, an imino group, a mercapto group, sulfone group, a carboxyl group, an ether group, an acyl group, a vinyl group, and the like. The monomer other than the organic silicon compounds represented by the general formula (1) includes silicon compounds such as alkoxysilane and alkylalkoxysilane, and moreover may be a metal compound including an inorganic component such as aluminum, titanium, magnesium, zirconium, tantalum, niobium, molybdenum, cobalt, nickel, gallium, beryllium, yttrium, lanthanum, hafnium, tin, lead, vanadium and boron. Note that, in a case of the copolymerization of the (i) or (ii), the ratio of the organic silicon compound represented by the general formula (1) preferably accounts for 30% or more in the total amount of the monomer to be copolymerized.

When the organic silicon compounds represented by the general formula (1) are polymerized, a siloxane binding (Si—O—Si) is formed through the hydrolysis and the subsequent condensation reaction in the portion where $R^1$ is bound to Si in the general formula (1). At this time, a silanol group (Si—OH) is formed in part. Even if the silanol group is formed, the characteristics of the porous material are not affected. For example, when the polymerization reaction is performed on the organic silicon compounds in which $R^1$ is an ethoxy group, n is 3, and m is 2 in the general formula (1), the reaction equation is represented by the following general formula (2):

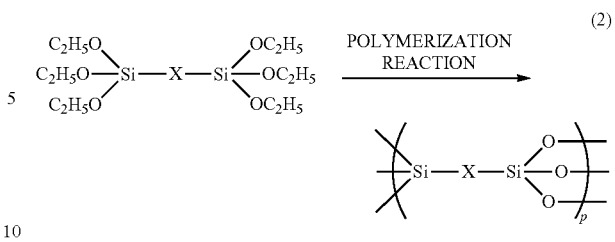

[where X is the above organic group, p is an integer corresponding to the number of polymerization repetition.]

Incidentally, the number of p is not particularly limited, and is preferably within a range of about 10 to 1000 in general.

The polymer formed by polymerizing the monomers in the above manner is an organic silica-base material having a skeleton with an organic group (X), silicon atoms (Si) and oxygen atoms (O) as main components. The polymer has a highly cross-linked network structure with a basic skeleton (—X—Si—O—) in which the silicon atoms is bound to the organic group with the oxygen atoms bound to the silicon atom.

A method of polymerizing the monomers is not particularly limited. The polymerization method is preferably performed by hydrolyzing and condensing the monomers in the presence of an acidic or basic catalyst using water or a mixture solvent of water and an organic solvent as a solvent. The organic solvent suitably used here includes alcohol, acetone, and the like. When the mixture solvent is used, the content of the organic solvent is preferably about 5% by weight to 50% by weight. The acidic catalyst to be used includes a mineral acid such as hydrochloric acid, nitric acid, sulfuric acid, and the like. When the acidic catalyst is used, the solution is preferably acid with a pH of 6 or less (more preferably 2 to 5). In addition, the basic catalyst to be used includes sodium hydroxide, ammonium hydroxide, potassium hydroxide, and the like. When the basic catalyst is used, the solution is preferably basic with a pH of 8 or more (more preferably 9 to 11).

The content of the monomers in the polymerization process is preferably about 0.0055 mol/L to 0.33 mol/L in the concentration of silicon equivalent. The various conditions (temperature, time, and the like) in the polymerization process are not particularly limited, and suitably selected in accordance with the targeted polymer and the monomer to be used. In general, the organic silicon compound is preferably hydrolyzed and condensed at a temperature of about 0° C. to 100° C. for a time period of about 1 hour to 48 hours.

The polymer formed by polymerizing the monomers (polymer of the organic silicon compounds represented by the general formula (1)) generally has an amorphous structure, but can have a periodic structure based on a regular arrangement of the organic groups, depending on the synthesis conditions. Although such periodicity depends on the molecular length of the monomers to be used, the periodicity of the periodic structure is preferably 5 nm or less. The periodic structure is maintained even after the monomers are polymerized. The formation of the periodic structure can be recognized by the peak appeared in a region where the d value is 5 nm or less in the X-ray diffraction (XRD) measurement. Even when such a peak is not recognized in the X-ray diffraction measurement, the periodic structure is partially formed in some cases. Such a periodic structure is generally formed with a layered structure described below, but not limited to this case.

When the periodic structure is formed in the porous material according to the present invention on the basis of the regular arrangement of the organic group, an interaction among the organic groups is increased, and thereby the electron transfer efficiency tends to be significantly improved. The mechanism, in which the formation of the periodic structure allows the interaction among the organic groups to increase, and thereby the electron transfer efficiency is significant improved, is not necessarily clear. However, the present inventors estimate the mechanism as follows. Specifically, when the organic groups which functions as the electron donor as described above are regularly arranged, a uniform band structure is formed and maintained. As a result, the electron orbits of the organic groups tend to be overlapped.

Therefore, the interaction among the organic groups is increased, and thereby the electron transfer efficiency is significantly improved.

The synthesis conditions suitable for forming such a periodic structure based on the regular arrangement of the organic groups include the following various conditions.

(i) The periodic structure is formed by the interaction exerted within the monomers. Thus, it is preferable to use the organic group (X) which increases the interaction within the monomers, i.e. benzene, biphenyl, naphthalene and anthracene.

(ii) The solution preferably has a pH of 1 to 3 (acidic) or 10 to 12 (basic), and more preferably has 10 to 12 (basic).

Such a periodic structure can be obtained according to the method described in, for example, S. Inagaki et al., Nature, 2002, vol. 416, pp 304-307.

Furthermore, pores can be formed in the obtained polymer (polymer of the organic silicon compounds represented by the general formula (1)) by controlling the synthesis conditions when the monomers are polymerized, or by mixing a surfactant with the raw materials. In the former case, the solvent serves as a template. In the latter case, the micelle or a liquid crystal structure in the surfactant serves as template. Accordingly, the porous material having pores is formed.

In particular, the surfactant to be described below is preferably used because a mesoporous material having a mesopore with a central pore diameter of 1 nm to 30 nm in a pore diameter distribution curve is obtained. The central pore diameter is a pore diameter at the maximum peak of the curve (pore diameter distribution curve) obtained by plotting values (dV/dD) obtained by differentiating the pore volume (V) by the pore diameter (D) to the pore diameter (D). The central pore diameter can be obtained by the method described below. Specifically, the porous material is cooled to a liquid nitrogen temperature (−196° C.). Then, a nitrogen gas is introduced to determine the absorbed amount thereof by a volumetrical method or gravimetrical method. Thereafter, the pressure of the nitrogen gas to be introduced is gradually increased. Then, the adsorbed amount of the nitrogen gas to each equilibrium pressure is plotted to obtain an adsorption isotherm. Using the adsorption isotherm, a pore diameter distribution curve can be obtained by a Cranston-Inklay method, Pollimore-Heal method or BJH method.

Such a mesoporous material preferably has the pore with a central pore diameter of 1 nm to 30 nm. When the central pore diameter is less than the lower limit, the size of average of pore tend to become small compared with the size of the electron donor and the electron acceptor. In contrast, when the central pore diameter exceeds the upper limit, the photocatalytic performance tends to reduce.

Such a mesoporous material preferably has 60% or more of the total pore volume within a range of ±40% of the central pore diameter in the pore diameter distribution curve. The fact that the mesoporous material satisfies this condition means that the mesoporous material has pores with very uniform diameters. The specific surface area of the mesoporous material is not particularly limited, and is preferably 700 $m^2/g$ or more. The specific surface area can be calculated as a BET specific surface area from the adsorption isotherm by using a BET isothermal adsorption equation.

Furthermore, such a mesoporous material preferably has one or more peaks at a diffraction angle corresponding to the d value of 1 nm or more (more preferably 1.5 nm to 30.5 nm) in the X-ray diffraction (XRD) pattern. The X-ray diffraction peak means that the periodic structure having the d value corresponding to the peak angle is present in the sample. Accordingly, the fact that one or more peaks are present at a diffraction angle corresponding to the d value of 1.5 nm to 30.5 nm means that the pores are regularly arranged at intervals of 1.5 nm to 30.5 nm.

The pores which such a mesoporous material includes are formed not only on the surface of the porous material but also in the inside thereof. The pore arrangement state (pore arrangement structure or structure) in such a porous material is not particularly limited, and is preferably of a 2d-hexagonal structure, 3d-hexagonal structure, or a cubic structure. Such a pore arrangement structure may have a disordered pore arrangement structure.

Here, the fact that the porous material has a hexagonal pore arrangement structure means that the arrangement of the pores is of a hexagonal structure (see: S. Inagaki et. al., J. Chem. Soc., Chem. Commun., p. 680 (1993); S. Inagaki et al., Bull. Chem. Soc. Jpn., 69, p. 1449 (1996); Q. Huo et al., Science, 268, p. 1324 (1995)). Moreover, the fact that the porous material has a cubic pore arrangement structure means that the arrangement of the pores is of a cubic structure (see: J. C. Vartuli et al., Chem. Mater., 6, p. 2317 (1994); Q. Huo et al., Nature, 368, p. 317 (1994)). In addition, the fact that the porous material has a disordered pore arrangement structure means that the arrangement of the pores is irregular (see: P. T. Taney et al., Science, 267, p. 865 (1995); S. A. Bagshaw et al., Science, 269, p. 1242 (1995); R. Ryoo et al., J. Phys. Chem., 100, p. 17718 (1996)). Furthermore, the cubic structure is preferably Pm-3n, Ia-3d, Im-3m or Fm-3m symmetrical. The symmetrical property is determined based on the notation of a space group.

If the periodic structure is formed in the pore wall of such a porous material, the electron transfer from the organic group (electron donor) of the porous material to the electron acceptor is occurred with a high efficiency. Furthermore, a surfactant is desirably added to the monomers for polycondensation to obtain the mesoporous material. This is because the added surfactant serves as a template in the polycondensation of the monomers to form the mesopores.

Such a surfactant used in obtaining the mesoporous material is not particularly limited, and may be any one of cationic, anionic and non-ionic. To be more specific, the surfactant includes: the chloride, bromide, iodide and hydroxide of alkyltrimethylammonium, alkyltriethylammonium, dialkyldimethylammonium, benzyl ammonium and the like; fatty acid salt, alkylsulfonate, alkylphosphate, polyethyleneoxide-based non-ionic surfactant, primary alkyl amine and the like. These surfactants are used alone or in mixture of two or more kinds.

Of the surfactants, the polyethyleneoxide-based non-ionic surfactant includes one having a hydrocarbon group as a hydrophobic component, and polyethylene oxide as a hydrophilic component. The surfactant preferably can be used is one represented by a general formula, for example, $C_nH_{2n+1}(OCH_2CH_2)_mOH$ where n is 10 to 30 and where m is 1 to 30.

Additionally, the esters of sorbitan and fatty acids such as oleic acid, lauric acid, stearic acid, palmitic acid and the like, as well as the compounds formed by adding polyethylene oxide to these esters can also be used as the surfactant.

Furthermore, the triblock copolymer of polyalkylene oxide can be used as the surfactant. Such a surfactant includes one which is made of polyethylene oxide (EO) and polypropylene oxide (PO), and which is represented by a general formula $(EO)_x(PO)_y(EO)_x$. Here, x and y represent the repetition numbers of EO and PO, respectively. Preferably, x is 5 to 110, and y is 15 to 70. More preferably, x is 13 to 106, and y is 29 to 70. The triblock copolymer includes $(EO)_{19}(PO)_{29}(EO)_{19}$, $(EO)_{13}(PO)_{70}(EO)_{13}$, $(EO)_5 (PO)_{70} (EO)_5$, $(EO)_{13} (PO)_{30} (EO)_{13}$, $(EO)_{20} (PO)_{30} (EO)_{20}$, $(EO)_{26} (PO)_{39}(EO)_{26}$, $(EO)_{17} (PO)_{56} (EO)_{17}$, $(EO)_{17} (PO)_{58} (EO)_{17}$, $(EO)_{20} (PO)_{70}(EO)_{20}$, $(EO)_{80} (PO)_{30} (EO)_{80}$, $(EO)_{106} (PO)_{70} (EO)_{106}$, $(EO)_{100} (PO)_{39} (EO)_{100}$, $(EO)_{19} (PO)_{33} (EO)_{19}$ and $(EO)_{26}(PO)_{36} (EO)_{26}$. These triblock copolymers are available from BASF Corp., Aldrich Corp., and the like. The triblock copolymer having desired x and y values can also be obtained in a small-scale production level.

A star diblock copolymer formed by binding two polyethylene oxide (EO) chain-polypropylene oxide (PO) chains to each of two nitrogen atoms of ethylenediamine can also be used. Such a star diblock copolymer includes one represented by a general formula $((EO)_x(PO)_y)_2NCH_2CH_2N((PO)_y(EO)_x)_2$ where x and y represent the repetition numbers of EO and PO, respectively.

Preferably, x is 5 to 110, and y is 15 to 70. More preferably, x is 13 to 106, and y is 29 to 70.

Of such surfactants, the salt (preferably halide salt) of alkyltrimethylammonium $[C_pH_{2p+1}N(CH_3)_3]$ is preferably used because the mesoporous material having a high crystallinity can be obtained. In this case, alkyltrimethylammonium preferably has a carbon number of 8 to 22 in the alkyl group thereof. Such a substance includes octadecyltrimethylammonium chloride, hexadecyltrimethylammonium chloride, tetradecyltrimethylammonium chloride, dodecyltrimetylammonium bromide, decyltrimethylammonium bromide, octyltrimethylammonium bromide, docosyltrimethylammonium chloride and the like.

To obtain the mesoporous material as the polymer of the monomers, the monomers are polymerized in a solution containing the surfactant. The concentration of the surfactant in the solution is preferably 0.05 mol/L to 1 mol/L. When the concentration is less than the lower limit, the pores tend to incompletely be formed. In contrast, when the concentration exceeds the upper limit, the amount of the surfactant which is unreacted and left in the solution tends to be increased. As a result, the uniformity of the pores tends to be reduced.

A method of removing the surfactant contained in the thus obtained mesoporous material includes, for example, (i) a method of removing the surfactant by immersing the mesoporous material in an organic solvent (for example ethanol) with a high solubility to the surfactant, (ii) a method of removing the surfactant by calcining the mesoporous material at 300° C. to 1000° C., and (iii) an ion-exchange method in which the mesoporous material is immersed in an acidic solution and heated to exchange the surfactant with hydrogen ions.

Such a mesoporous material can be obtained according to the method described in Japanese Unexamined Patent Application Publication No. 2001-114790 and the like.

As the porous material according to the present invention which includes the electron donor in the skeleton thereof, a silica porous material treated so as to function as an electron donor may be used. Such a silica porous material includes FSM, MCM-41, SBA-15, MCM-48, SBA-1, SBA-2, and the like, which have been treated so as to function as the electron donor. The treatment to cause the silica porous material to function as the electron donor includes, for example, an alkali treatment. As such an alkali treatment, it is preferable to employ a method in which the silica porous material is immersed in an aqueous solution of alkali metal hydroxide, alkali earth metal hydroxide, ammonium, and the like. By performing such a treatment, a Si—O$^-$ group is formed on the surface of the silica porous material. As a result, the Si—O$^-$ group functions as the electron donor, and allows electrons to be transferred to an electron acceptor to be described below.

Next, the electron acceptor according to the present invention will be described. In the present invention, the electron acceptor is disposed in at least one portion among the pore, the skeleton and the outer circumference of the porous material. When the light energy conversion material of the present invention is irradiated with light, the electrons are transferred from the electron donor in the porous material to the electron acceptor (energy acceptor). Herein, the recited "disposition" is referred to the state in which the electron donor is fixed by covalent binding, ion exchange, physical exchange, and the like in at least one portion among the pore, the skeleton and outer circumference of the porous material.

The electron acceptor according to the present invention is not particularly limited, and the electron acceptor preferably used is at least one kind selected from the group consisting of a quinone compound, an aromatic compound having a vinyl group, an aromatic compound having a cyano group, an aromatic compound having a nitro group, a nitrogen-containing aromatic compound, an organic compound having a dicyanomethylene group, a molecular metal complex containing an organic compound having a dicyanomethylene group as a ligand, an organic compound having a cyanoimino group, a molecular metal complex containing an organic compound having a cyanoimino group as a ligand, fullerene, a carbon nanotube, a metal complex having a nitrogen-containing organic ligand, a metal complex having a cyclic ligand, a metal complex salt, a metal ion, a metal oxide, and a derivative thereof. Among the electron acceptor described above, from the point of view that the electrons are transferred from the above described electron donor with a higher efficiency, it is preferable to use compounds represented by the following general formula (3):

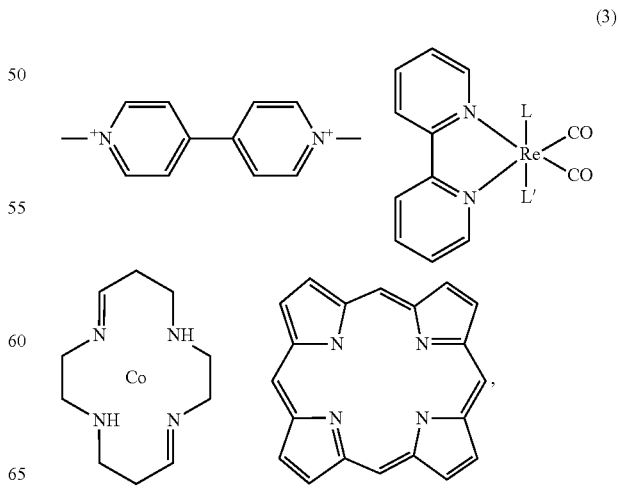

(3)

Cr(2,2'-bipyridine)$_3^{2+}$, Cr(2,2'-bipyridine)$_3^{3+}$, Cr(CN)$_6^{3-}$, Fe(CN)$_6^{4-}$, Fe$^{3+}$, N,N-dimethylaniline Pt (P$_2$O$_5$)$_4$H$_8^{4-}$, methyl p-cyanobenzoate, p-dicyanobenzene, p-dinitrobenzene, p-benzoquinone, ReCl$_8^{2-}$Rh$_2$(1,3-diisocyanopropane)$_4^{2+}$, Ru(2,2'-bipyridine)$_3^{2+}$, trans-stilbene, UO$_2^{2+}$, a Zn porphyrin complex, Zn(tetraphenylporphyrin), Zn(octaethylporphyrin), Zn phthalocyanine, acetophenone, anthracene, an osmium(II) complex, chloranil, cyanoanthracene, cyanonaphthalene, dimethylaniline, dicyanoanthracene, dicyanonaphthalene, dimethylbicyclohepta-2,5-diene-2,3-dicarboxylate, tetracyanoanthracene, tetracyanoethylene, triphenylpyrylium tetrafluoroborate, naphthalene, nitrobenzene, viologen, phenanthrene, fullerene C60, fullerene C60-µ-oxodimer(C120O), fullerene C70, benzophenone, methylviologen, methoxyacetophenone, oxygen, an aromatic vinyl polymer, and the like.

The content of the electron acceptor is preferably 0.1% by mass to 50% by mass relative to the total amount of the light energy conversion material, more preferably 1% by mass to 10% by mass. When the content of the electron acceptor is less than the lower limit, the charge separation tends not to occur sufficiently. On the other hand, when the content of the electron acceptor exceeds the upper limit, the pore space is filled with the electron acceptor. As a result, sufficient space for the reaction cannot be secured.

The content ratio between the electron donor (organic molecule in the organic group) and the electron acceptor is preferably within a range of 1:0.1 to 1:10 in molar ratio, more preferably within a range of 1:0.5 to 1:15. When the content ratio of the electron donor is less than the lower limit, the charge separation tends to be insufficient. In the meanwhile, when the content ratio of the electron donor exceeds the upper limit, the charge separation tends to be insufficient.

In the present invention, the electron acceptor is disposed in at least one portion among the pore, the skeleton and the outer circumference of the porous material. Thus, the electron donor and the electron acceptor are disposed in proximity to each other. As a result, the occurrence of electrons and holes by the charge separation is accelerated. In addition, the electron acceptor is physically stabilized by fixedly disposing the electron acceptor in the pore, skeleton, and the like, of the porous material to be disposed, and thereby the durability of the light energy conversion material is improved.

Furthermore, a method of disposing the electron acceptor in at least one portion among the pore, the skeleton and the outer circumference of the porous material is not particularly limited. A known method, by which the electron acceptor can be disposed in any portion described above, can suitably be employed. For example, the method can be employed is: a method in which the electron donor and the electron acceptor are fixedly disposed by covalent binding; or a method in which the electron donor and the electron acceptor are fixedly disposed by ion-exchange or by physical exchange. To be specific, the following methods may be employed: a method in which the porous material and the electron acceptor are mixed and heated to covalently bind them to each other, and then in which the electron acceptor are disposed in at least one portion among the pore, the skeleton and the outer circumference of the porous material; a method in which the porous material, the electron acceptor and the like are mixed, irradiated with ultrasonic waves, and then heated to covalently binding them to each other, and in which the electron acceptor are disposed in at least one portion among the pore, the skeleton and the outer circumference of the porous material; or a method in which a porous material having a thiol group and a sulfonate group in the skeleton is used, in which the porous material is added into the solution containing the electron acceptor, and stirred to fix the electron acceptor to each other by ion binding, and in which the electron acceptor are disposed in at least one portion among the pore, the skeleton and the outer circumference of the porous material. Furthermore, the electron donor or the electron acceptor may be disposed either at the same time or separately in at least one portion among the pore, the skeleton, and the outer circumference of the porous material.

The formation of the charge separation state by the photoelectron transfer between the electron donor (D) and the electron acceptor (A) is progressed in systems where: the molecules D and A form a charge transfer complex; the molecules D and A form an exciplex; and the molecules D and A are cross-linked. The electron donor/the electron acceptor, when the molecules D and A form the charge transfer complex, includes benzene/iodine, benzene/(NC)$_2$C=C(CN)$_2$, benzene/trinitrobenzene, benzene/tetracyanobenzene, hexamethylbenzene/tetracyanobenzene, benzene/maleic acid, ferrocene/trichloromethane, anthracene/diquat, anthracene/methylviologen, anthracene/N-methylcyanopyridinium, anthracene/N-methylcyanopyridinium, naphthalene/methylviologen, naphthalene/N-methylcyanopyridinium, dimethoxybenzene/methylviologen, carbon nanotube/methylviologen, and the like.

The electron donor/the electron acceptor, when the molecules D and A forms the exciplex, includes triethylamine/naphthalene, triethylamine/anthracene, diethylaniline/naphthalene, naphthalene/dicyanoanthracene, diethylaniline/pyrene, pyrene/dicyanobenzene, and the like.

Furthermore, the electron donor/the electron acceptor when the molecules D and A are cross-linked includes Zn porphyrin/fullerene (C60 or C70), porphyrin free base/fullerene (C60 or C70), ferrocene/Zn porphyrin, Zn porphyrin/porphyrin free base, Zn porphyrin/pyridylnaphthalenediimide, ferrocene/anthraquinone, ferrocene/fullerene (C60), thiophene polymer/fullerene (C60), N,N-di(6-tert-butylbiphenyl)-benzeneamine/fullerene (C60) and the like.

EXAMPLES

The present invention will more specifically be described below based on examples and comparative example. However, the present invention is not limited to the following examples.

Synthesis Example 1

Synthesis of Crystalline Powders of Silica Porous Material Modified by Biphenyl Group (BiPh-HMM)

First, trimethyloctadecylammonium chloride (surfactant: 1.83 g, 5.26 mol) was dissolved in a mixed liquid of water (100 ml) and a 6M aqueous solution of sodium hydroxide (10 g) to obtain a mixed solution. Then, 4,4'-bis(triethoxysilyl)biphenyl (2.00 g, 4.18 mol) was added dropwise into the obtained mixed solution while stirring at room temperature. Thereafter, the irradiation with ultrasonic waves for 20 minutes and the stirring were repeated to the mixed solution. Subsequently, the solution was stirred for 24 hours at room temperature to obtain a reaction solution. After that, the reaction solution was left at rest at a temperature condition of 98° C. for 48 hours. Then, the reaction solution was heated to obtain a silica porous material modified by a biphenyl group (BiPh-HMM) containing the surfactant. Subsequently, BiPh-HMM containing the surfactant was suspended in a mixed liquid containing ethanol (260 ml) and concentrated hydrochloric acid (11.7 g). Thereafter, the suspended liquid was stirred while heating at a temperature condition of 70° C. for 7 hours to extract the surfactant from the BiPh-HMM. After that, the suspended liquid was filtered. Then, the obtained white powders were washed with ethanol and dried in vacuum to obtain BiPh-HMM crystalline powders.

The BiPh-HMM crystalline powders obtained in the above manner was measured by the X-ray diffraction (XRD). FIG. 1 shows the obtained XRD pattern of the BiPh-HMM crystalline powders. From the result shown in FIG. 1, a regularly arranged mesoporous structure (d=45.04 Å) was recognized in the obtained BiPh-HMM crystalline powders. Furthermore, the periodic structure (d=11.78 Å, 5.90 Å, 3.94 Å, 2.96 Å, 2.37 Å) of the biphenyl groups was recognized in the pore wall.

Figure 2:
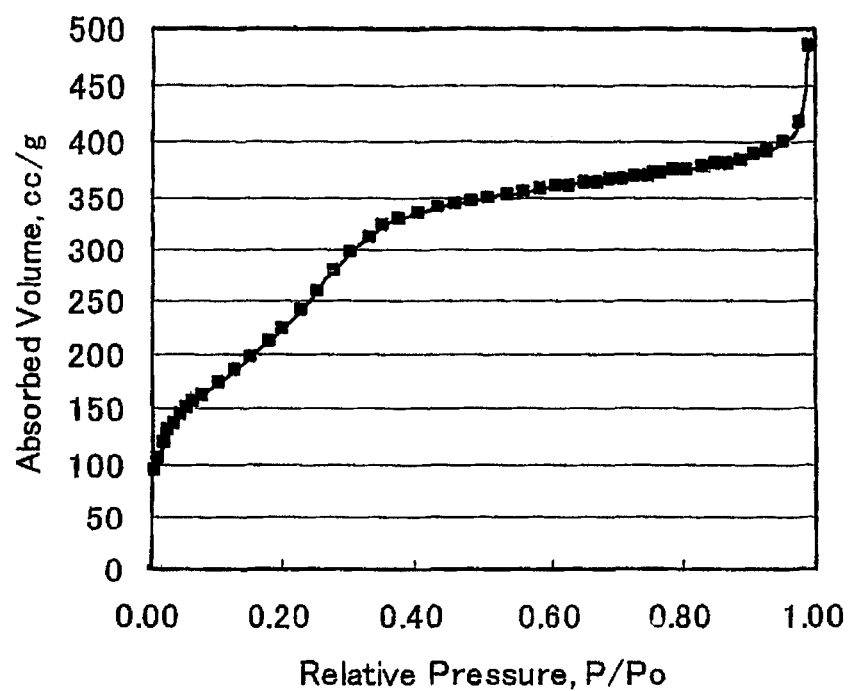
FIG. 2 is a graph showing a nitrogen adsorption and desorption isotherm of the BiPh-HMM obtained in Synthesis example 1.

Next, the adsorbed amount of the nitrogen to the BiPh-HMM crystalline powders obtained in Synthesis example 1 was measured. FIG. 2 shows the nitrogen adsorption and desorption isotherm of the obtained BiPh-HMM. As apparent from the result shown in FIG. 2, it was recognized that the BiPh-HMM obtained in Synthesis example 1 showed the typical type IV of the adsorption and desorption isotherm in the mesoporous material. Moreover, it was recognized from the calculation based on the adsorption isotherm shown in FIG. 2 that the specific surface area of the pore (BET) was 793.90 m$^2$/g, that the pore diameter (BJH) was 23.9 Å, and that the pore volume was 0.502 cc.

Synthesis Example 2

Synthesis of Thin Film of BiPh-HMM

First, a triblock copolymer P123 ((EO)$_{20}$(PO)$_{70}$(EO)$_{20}$: surfactant: 0.40 g, 0.069 mmol) was dissolved in a mixed liquid of ethanol (3.0 g), water (0.18 g, 10 mmol) and 2M HCl aqueous solution (5.0 µl, 0.010 mmol) to obtain a mixed solution. Then, 4,4'-bis(triethoxysilyl)biphenyl (0.598 g, 1.25 mmol) was added dropwise into the obtained mixed solution. Thereafter, the mixture was stirred at room temperature for 21 hours to obtain a reaction solution. Subsequently, ethanol (2.0 g) was added to the obtained reaction solution to obtain a biphenyl silica sol solution. Then, the sol solution was spin-coated (4000 rpm, 10 s) on a glass plate or a silica glass. Subsequently, the sol was dried at room temperature for one day to obtain a spin-coat thin film. The temperature of the obtained spin-coat thin film was increased from room temperature to 250° C. over 6 hours. Thereafter, the temperature was maintained at 250° C. for 2 hours. Then, the P123 (surfactant) used as a template was removed to obtain a BiPh-HMM thin film.

Figure 3:
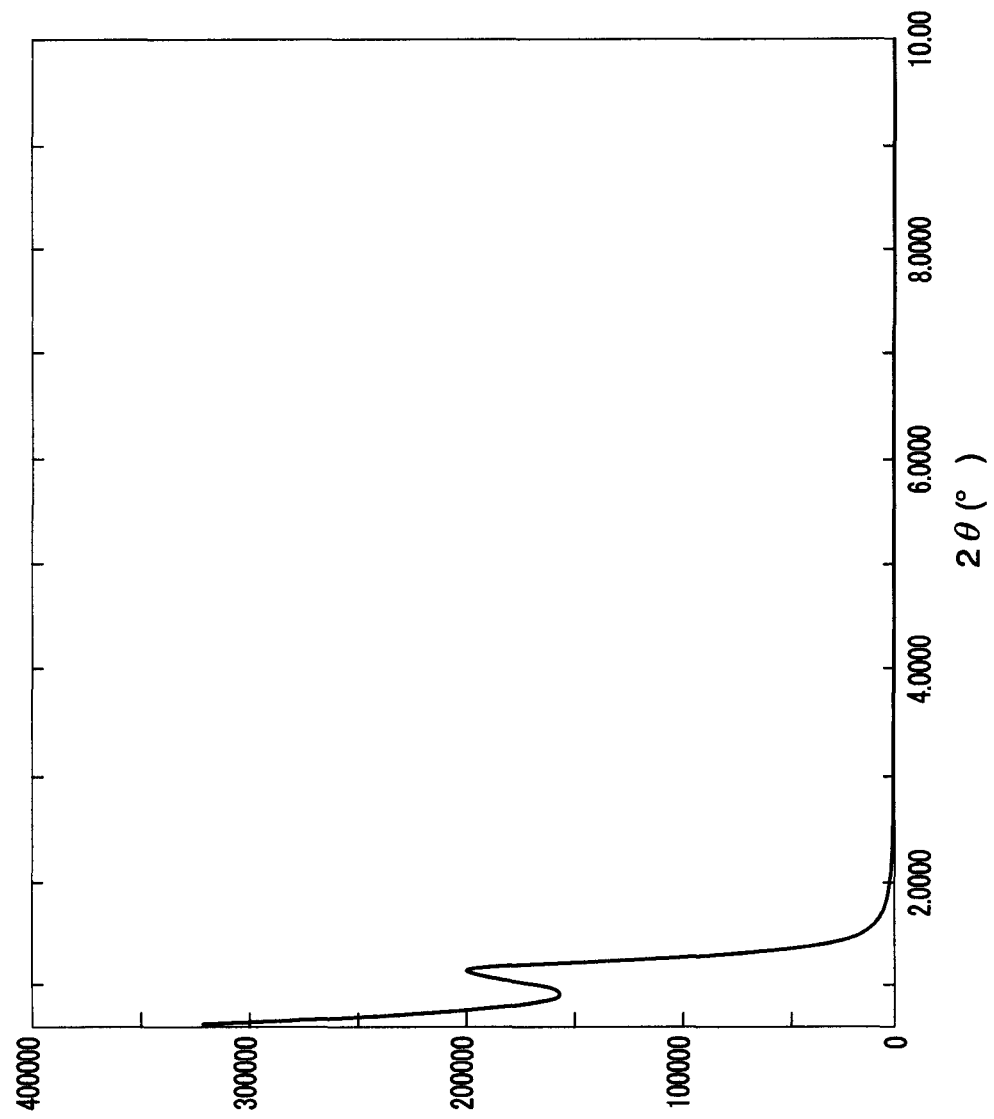
FIG. 3 is a graph showing an XRD pattern of a thin film of BiPh-HMM obtained in Synthesis example 2.

The obtained BiPh-HMM thin film was measured by the X-ray diffraction (XRD). FIG. 3 shows the obtained XRD pattern of the BiPh-HMM thin film. As apparent from the result shown in FIG. 3, it was recognized that the BiPh-HMM thin film showed a regularly arranged mesoporous structure at d=83.49 Å.

Synthesis Example 3

Synthesis of 4,4'-bipyridine Derivative

[N,N'-bis(3-(trimethoxysilanyl)propyl)-4,4'-bipyridini um Diiodide])

First, 4,4'-bipyridyl (1.80 g, 11.0 mmol), and (3-iodopropyl)trimethoxysilane (7.02 g, 24.2 mmol) were dissolved in acetonitrile (25 ml) in an argon atmosphere to obtain a mixed solution. Then, the obtained mixed solution was stirred at 40° C. for 7 hours. Thereafter, the solution was stirred while heating at 70° C. for 18 hours. Furthermore, it was stirred while heating at 85° C. for 24 hours. Subsequently, the precipitate obtained in the above manner was washed with dichloromethane, and dried in vacuum to obtain 7.62 g of 4,4'-bipyridine derivative (N,N'-Bis(3-(trimethoxysilanyl) propyl)-4,4'-bipyridini um diiodide).

The structure of 4,4'-bipyridine derivative obtained in the above manner was recognized by $^1$H-NMR. The obtained results are shown below:

$^1$H-NMR (500 MHz, D$_2$O): δ8.98 (d, 4H, J=6.7 Hz), 8.41 (d, 4H, J=6.7 Hz), 4.60 (t, 4H, J=7.3 Hz), 3.20 (s, 18H), 2.07-2.02 (m, 4H), 0.58-0.55 (m, 4H).

Example 1

First, the BiPh-HMM crystalline powders (0.4 g, 1.56 mmol) obtained in Synthesis example 1 was added to a solution prepared by dissolving the 4,4'-bipyridine derivative (100 mg, 0.136 mmol) obtained in Synthesis example 3 in water-containing acetonitrile (8 ml). Then, the mixture was treated with ultrasonic waves at room temperature for 1 minute. Thereafter, the mixture was stirred while heating at a temperature condition of 70° C. for 2 hours to form a precipitate. Subsequently, the precipitate obtained in the above manner was filtered, washed with water, and further washed with ethanol. Thereafter, the precipitate was dried in vacuum to obtain 0.462 g of crystalline powders of BiPh-HMM modified by viologen (SiVSi(I)-BiPh-HMM).

Figure 4:
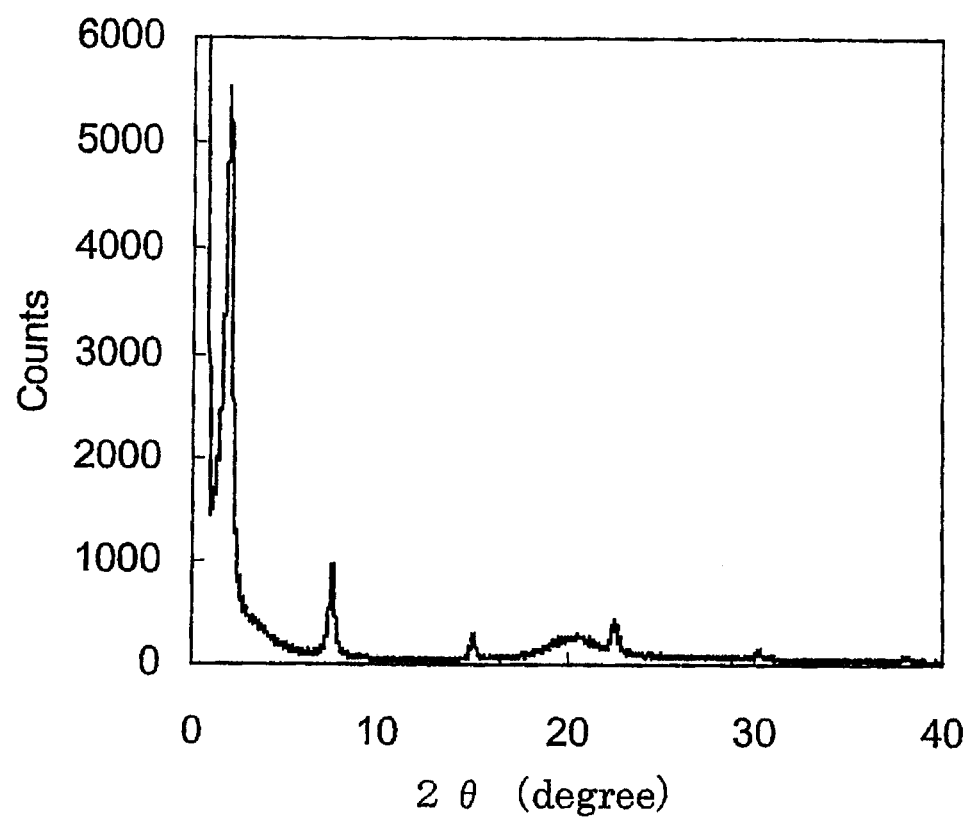
FIG. 4 is a graph showing an XRD pattern of SiVSi(I)-BiPh-HMM obtained in Example 1.

The SiVSi(I)-BiPh-HMM obtained in the above manner was measured by the X-ray diffraction. FIG. 4 shows the XRD pattern of the SiVSi(I)-BiPh-HMM. From the result shown in FIG. 4, a regularly arranged mesoporous structure (d=45.04 Å) was recognized in the SiVSi(I)-BiPh-HMM obtained in Example 1. Furthermore, the periodic structure (d=11.78 Å, 5.89 Å, 3.93 Å) of the biphenyl groups was recognized in the pore wall.

Figure 5:
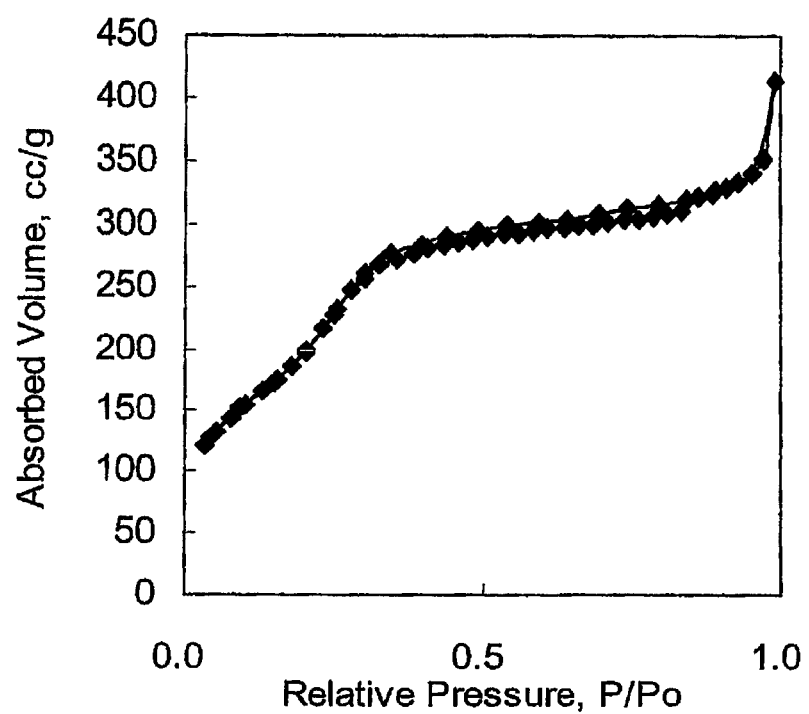
FIG. 5 is a graph showing a nitrogen adsorption and desorption isotherm of SiVSi(I)-BiPh-HMM obtained in Example 1.

Then, the adsorbed amount of the nitrogen to the SiVSi(I)-BiPh-HMM obtained in Example 1 was measured. FIG. 5 shows the obtained nitrogen adsorption and desorption isotherm of the SiVSi(I)-BiPh-HMM. As apparent from the result shown in FIG. 5, it was recognized that the SiVSi(I)-BiPh-HMM obtained in Example 1 showed the typical type IV of a nitrogen adsorption and desorption isotherm in the mesoporous material. In addition, from the calculation based on the adsorption isotherm shown in FIG. 5, it was recognized that the pore surface area (BET) was 699.48 m$^2$/g, that the pore diameter (BJH) was 23.0 Å, and that pore volume was 0.40 cc.

Figure 6:
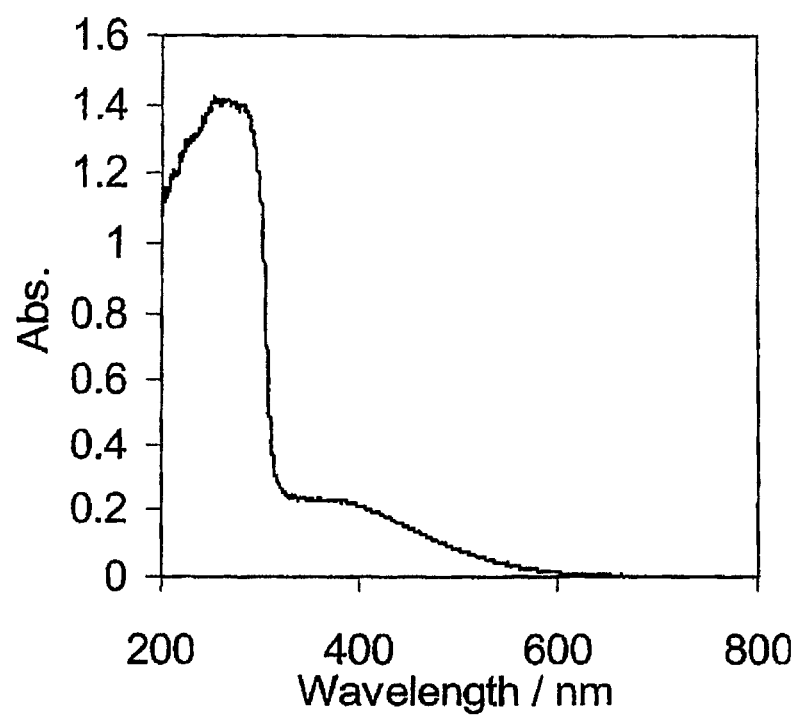
FIG. 6 is a graph showing a UV/Vis spectrum (diffuse reflection spectrum) of the SiVSi(I)-BiPh-HMM obtained in Example 1.

Next, the UV/Vis spectrum (diffuse reflection spectrum) of the SiVSi(I)-BiPh-HMM obtained in Example 1 was measured. FIG. 6 shows the graph of the obtained diffuse reflection spectrum. As apparent from the result shown in FIG. 6, the absorption by the BiPh group near 280 nm as the center was recognized in the SiVSi(I)-BiPh-HMM obtained in Example 1. Furthermore, a broad absorption by a charge transfer (CT) complex made of viologen and a biphenyl group was recognized at 400 nm.

Example 2

The SiVSi(I)-BiPh-HMM obtained in Example 1 (50 mg) was suspended in a saturated NH$_4$PF$_6$ aqueous solution (1 ml) to produce a suspended liquid. The produced suspended liquid was stirred at room temperature for one day. Thereafter, the suspended solid in the suspended liquid was filtered, washed with water, further washed with ethanol, and dried in vacuum to ion-exchange the counter anion of the viologen from iodine ions (I⁻) to hexafluorophosphate ion (PF₆⁻). Then, to completely carry out such an ion-exchange, the same operation was repeated twice to obtain 32.6 mg of crystalline powders of BiPh-HMM modified by viologen (SiVSi(PF₆)-BiPh-HMM).

Example 3

First, the thin film of the BiPh-HMM obtained in Synthesis example 2 was immersed in, and reacted to, a solution prepared by dissolving the 4,4'-bipyridine derivative obtained in Synthesis example 3 (100 mg, 0.136 mmol) in acetonitrile (5 ml) at room temperature for two days. After such a reaction, the BiPh-HMM thin film was washed with ethanol, and dried to obtain a thin film of BiPh-HMM modified by viologen (SiVSi(I)-BiPh-HMM-film).

Figure 7:
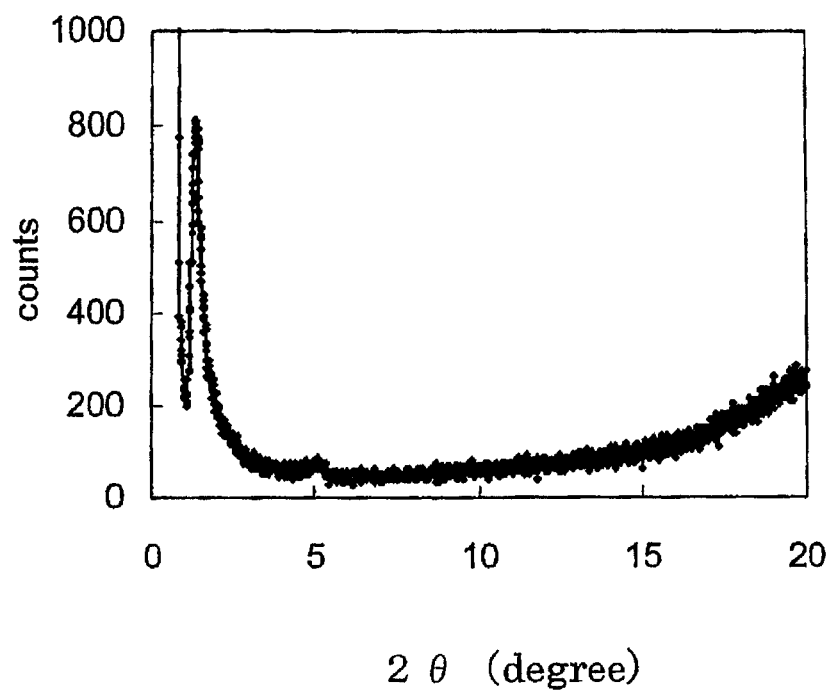
FIG. 7 is a graph showing an XRD pattern of SiVSi(I)-BiPh-HMM-film obtained in Example 3.

The SiVSi(I)-BiPh-HMM-film obtained in the above manner was measured by the X-ray diffraction. FIG. 7 shows the XRD pattern of the SiVSi(I)-BiPh-HMM-film. As apparent from the result shown in FIG. 7, the diffraction peak derived from the regularly arranged mesostructure was recognized at d=66.36 Å in the SiVSi(I)-BiPh-HMM-film obtained in Example 3.

Figure 8:
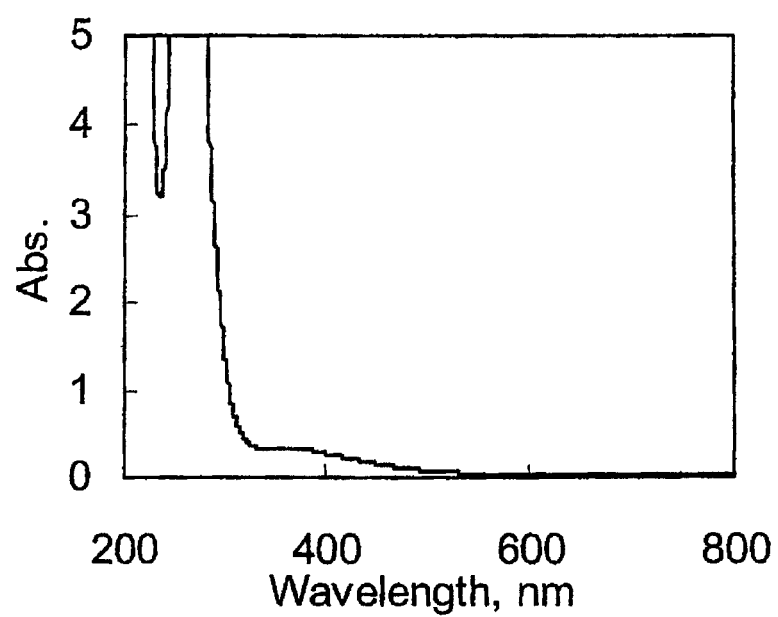
FIG. 8 is a graph showing an absorption spectrum of the SiVSi(I)-BiPh-HMM-film obtained in Example 3.

Next, the absorption spectrum of the SiVSi(I)-BiPh-HMM-film obtained in Example 3 was measured. FIG. 8 shows the obtained absorption spectrum of the SiVSi(I)-BiPh-HMM-film. As apparent from the result shown in FIG. 8, the absorption by the biphenyl group was recognized at 280 nm in the SiVSi(I)-BiPh-HMM-film obtained in Example 3. In addition, a broad absorption by a CT complex made of viologen and a biphenyl group was recognized at 400 nm.

Example 4

The crystalline powders (500 mg) of the BiPh-HMM obtained in Synthesis example 1 was added to 0.1% by mass of a NaOH methanol solution (100 g), and maintained for 3 minutes. Thereafter, the powders were suction-filtered, washed with ethanol, and dried in vacuum to obtain Na-BiPh-HMM (500 mg) in which an anion site (Si—ONa) was constructed on the surface of the mesopore.

Next, the obtained Na-BiPh-HMM (10.0 mg) and methylviologen dichloride (MV(Cl)₂: 3.0 mg, 0.010 mmol) were mixed in ion-exchanged water (0.3 ml), and were reacted at room temperature for 1 hour. Thereafter, the reaction liquid was connected to a vacuum line. The solvent was slowly distilled at room temperature under a reduced pressure to obtain crystalline powders of BiPh-HMM modified by methylviologen dichloride (MV(Cl)-Na-BiPh-HMM).

Figure 9:
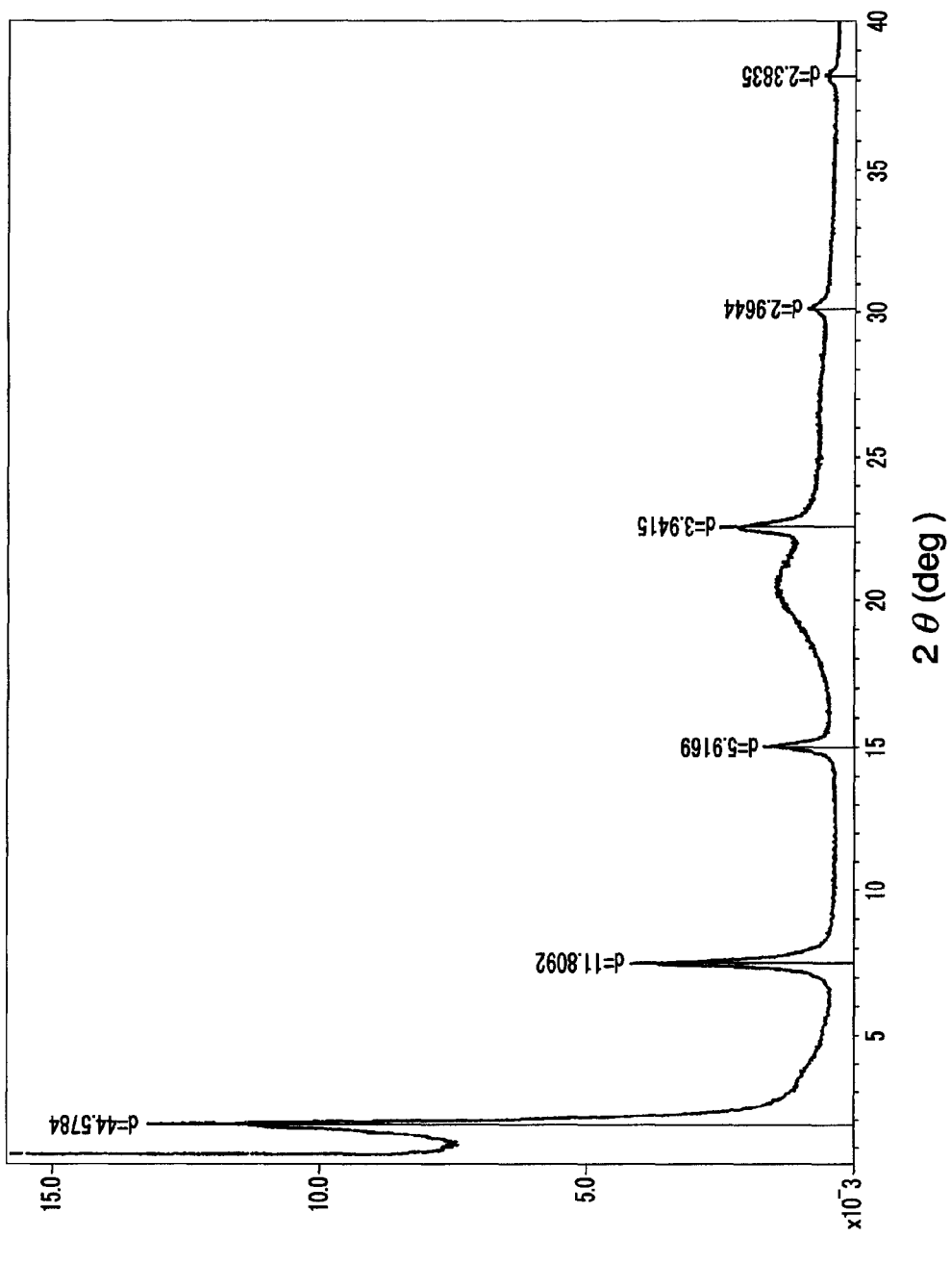
FIG. 9 is a graph showing an XRD pattern of MV(Cl)-Na-BiPh-HMM obtained in Example 4.

The MV(Cl)-Na-BiPh-HMM obtained in the above manner was measured by the X-ray diffraction. FIG. 9 shows the XRD pattern of the MV(Cl)-Na-BiPh-HMM. As apparent from the result shown in FIG. 9, a regularly arranged mesoporous structure (d=44.58 Å) was recognized in the MV(Cl)-Na-BiPh-HMM obtained in Example 4. In addition, the periodic structure (d=11.81 Å, 5.92 Å, 3.94 Å, 2.96 Å, 2.36 Å) of the biphenyl groups was recognized in the pore wall.

Figure 10:
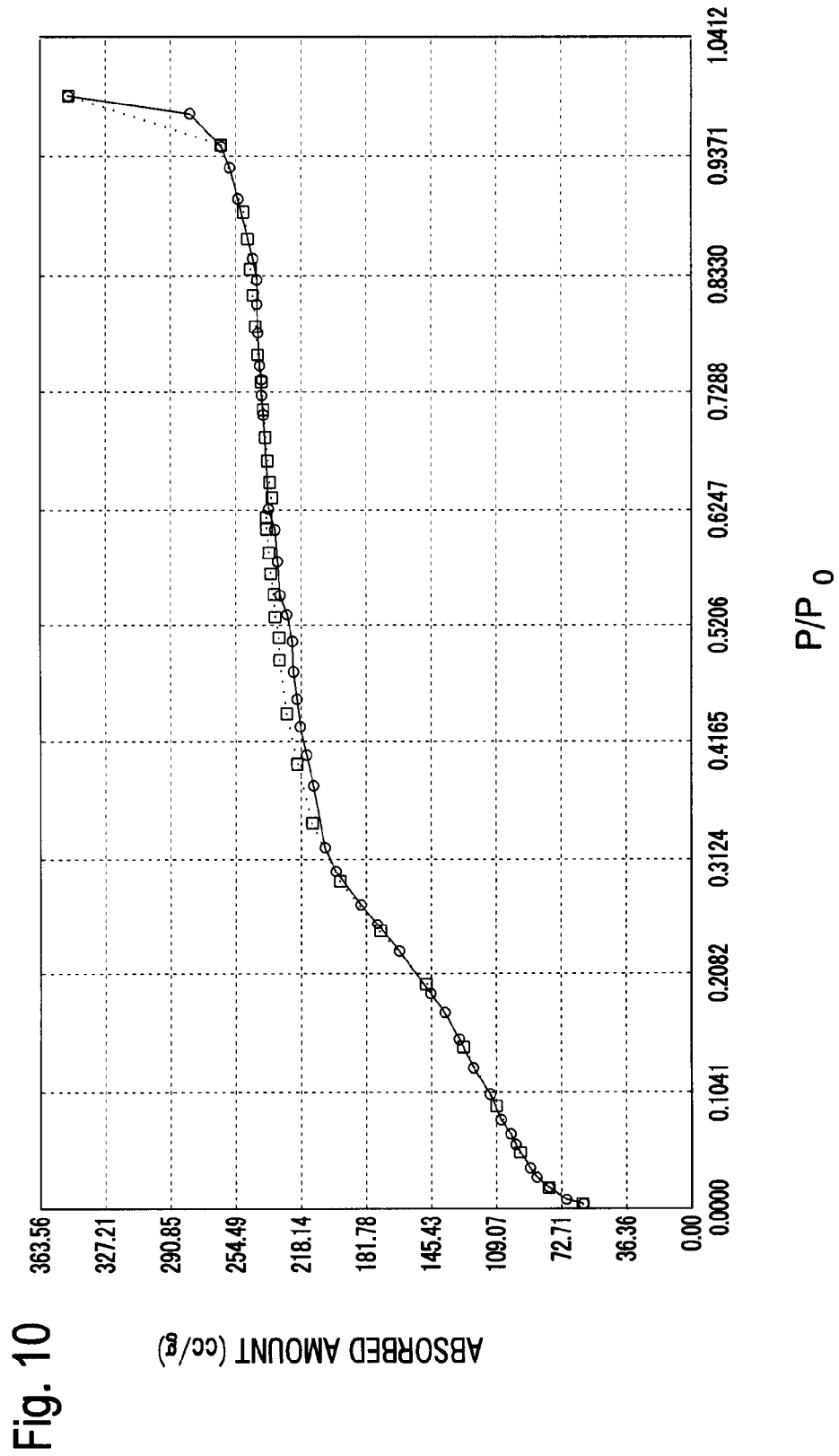
FIG. 10 is a graph showing a nitrogen adsorption and desorption isotherm of the MV(Cl)-Na-BiPh-HMM obtained in Example 4.

Next, the adsorbed amount of nitrogen to the MV(Cl)-Na-BiPh-HMM obtained in Example 4 was measured. FIG. 10 shows the obtained nitrogen adsorption and desorption isotherm of the MV(Cl)-Na-BiPh-HMM. AS apparent from the result shown in FIG. 10, it was recognized that the MV(Cl)-Na-BiPh-HMM obtained in Example 4 showed the typical type IV of the adsorption and desorption isotherm in the mesoporous material. In addition, from the calculation based on the adsorption isotherm shown in FIG. 10, it was recognized that the pore surface area (BET) was 509.74 m²/g, that the pore diameter (BJH) was 22.4 Å, and that the pore volume was 0.29 cc.

Examples 5 to 9

The BiPh-HMM (50 mg) obtained in Synthesis example 1, and methylviologen dichloride (MV(Cl)₂: <initial concentration> 20 mM (Example 5), 40 mM (Example 6), 70 mM (Example 7), 100 mM (Example 8), and 120 mM (Example 9)) were dispersed in water (1 ml). The dispersion was stirred at room temperature for 1 hour. Thereafter, the crystalline powders of each BiPh-HMM modified by methylviologen (MV(Cl)-BiPh-HMM) was obtained by centrifuging (3500 rpm, 30 min).

Figure 11:
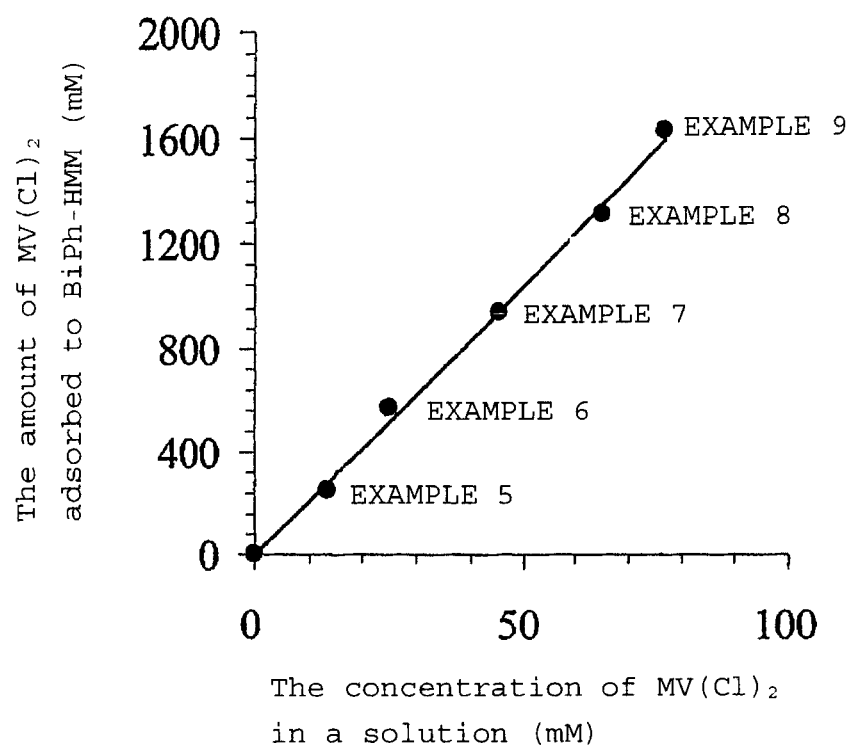
FIG. 11 is a graph showing the relationship between the concentration of $MV(Cl)_2$ in a solution in equilibrium and the amount of $MV(Cl)_2$ adsorbed to BiPh-HMM in Examples 5 to 9.
Figure 12:
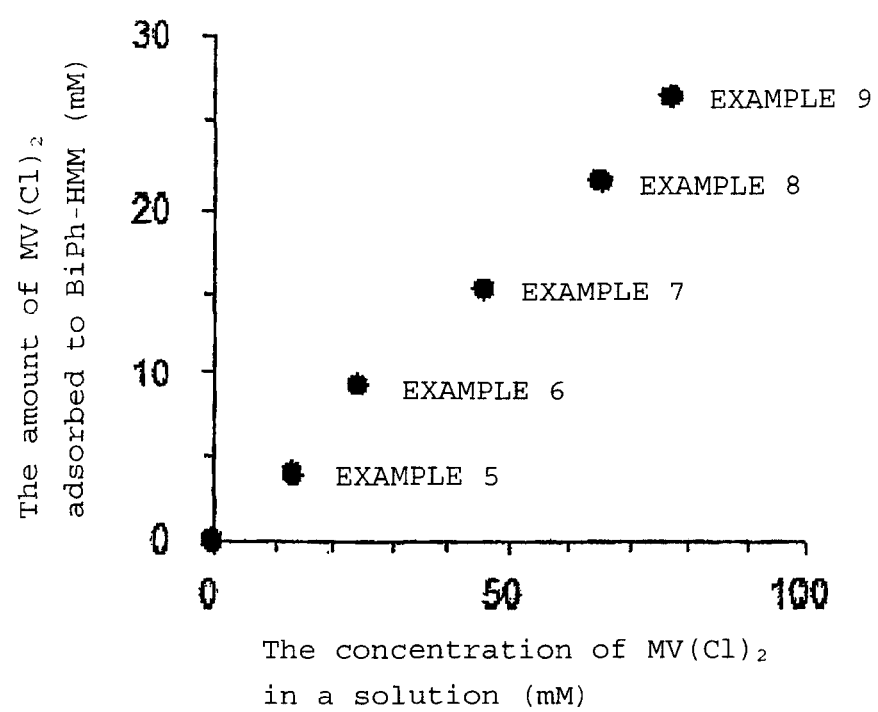
FIG. 12 is a graph showing the relationship between the concentration of $MV(Cl)_2$ in the solution in equilibrium and the amount of $MV(Cl)_2$ adsorbed to the BiPh-HMM in Examples 5 to 9.

To calculate the amount of MV(C1)₂ adsorbed to each MV(Cl)-BiPh-HMM obtained in Examples 5 to 9, the weight of the MV(Cl)₂ which was not adsorbed, and which was contained in the filtrate was measured. FIGS. 11 and 12 are graphs showing the relationship between the concentration of MV(Cl)₂ in the solution in equilibrium and the amount of MV(Cl)₂ adsorbed to the BiPh-HMM. As apparent from the results shown in FIGS. 11 and 12, a proportional relationship represented by the lines starting from the original points was recognized between the concentration of MV(Cl)₂ in the solution in equilibrium and the amount of MV(Cl)₂ adsorbed to the BiPh-HMM. In addition, by calculating the concentration of MV(Cl)₂ adsorbed into the pore of the porous material based on the pore volume, it was recognized that the concentration was about 20 times as high as the concentration of MV(Cl)₂ in the solution in equilibrium.

Figure 13:
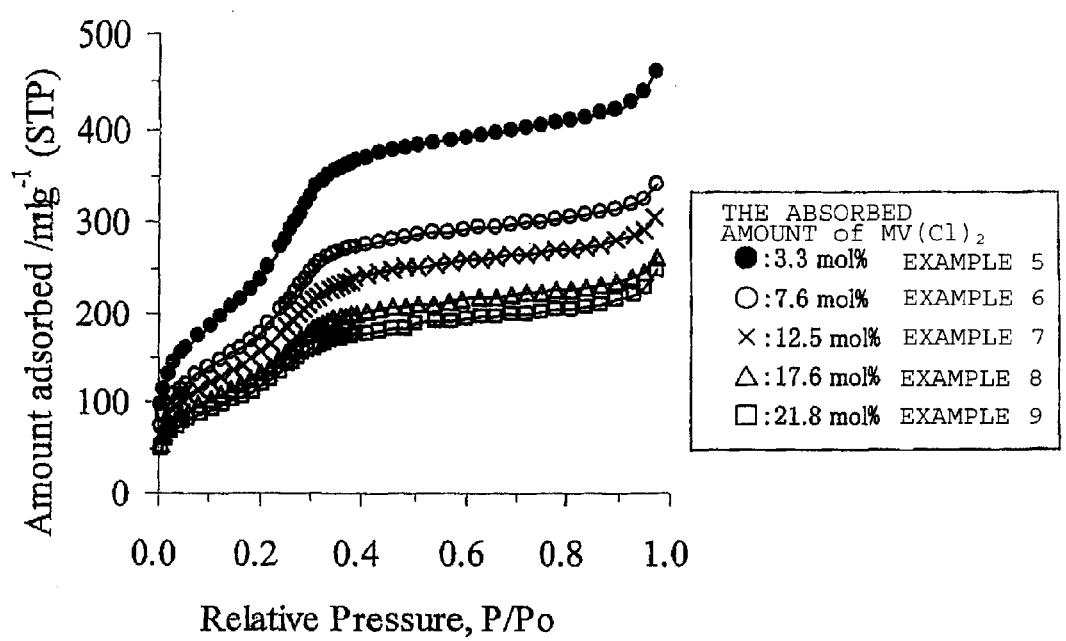
FIG. 13 is a graph showing nitrogen adsorption and desorption isotherms of MV(Cl)-BiPh-HMMs obtained in Examples 5 to 9.

Next, the adsorbed amounts of nitrogen to the MV(Cl)-BiPh-HMMs obtained in Examples 5 to 9 were measured. FIG. 13 shows the obtained nitrogen adsorption and desorption isotherms. As apparent from the result shown in FIG. 13, it was recognized that the pore volume was reduced as the adsorbed amount of MV(Cl)₂ was increased. It was recognized from this result that the MV(Cl)₂ was adsorbed in the pore of the MV(Cl)-BiPh-HMMs obtained in Examples 5 to 9.

Figure 14:
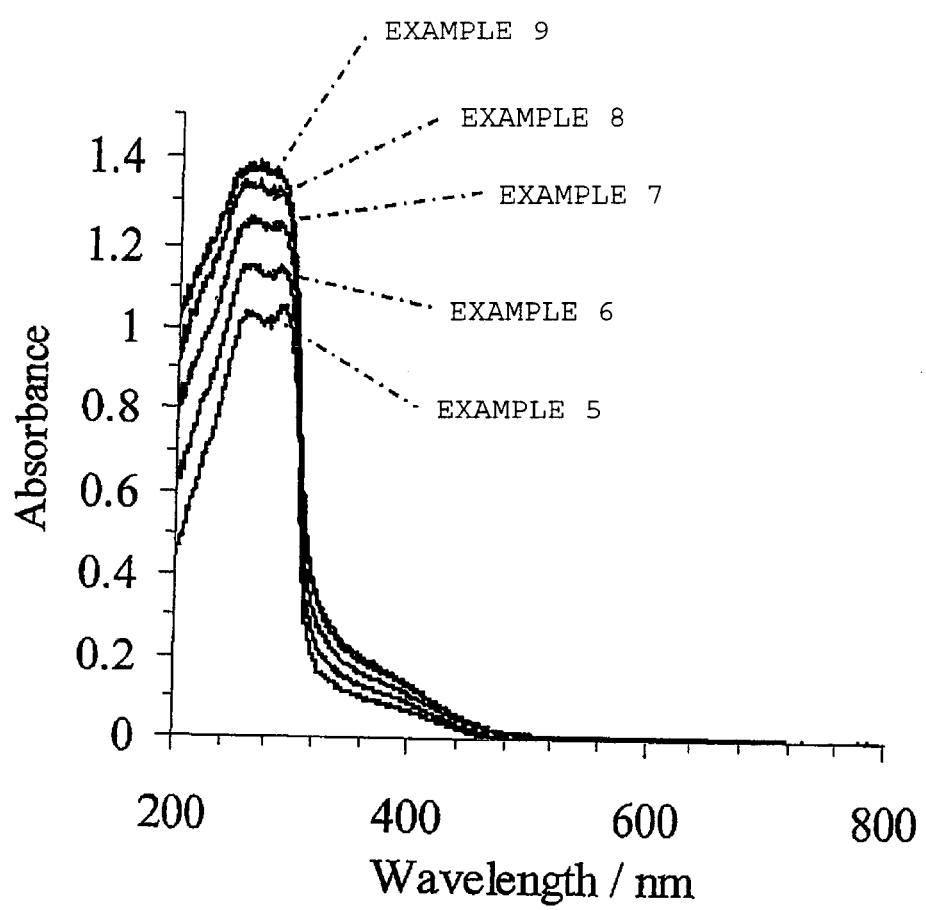
FIG. 14 is a graph showing UV/Vis spectra (diffuse reflection spectra) of the MV(Cl)-BiPh-HMMs obtained in Examples 5 to 9.

Next, the UV/Vis spectra (diffuse reflection spectra) of the MV(Cl)-BiPh-HMMs obtained in Examples 5 to 9 were measured. FIG. 14 is a graph showing the obtained diffuse reflection spectra. As apparent from the result shown in FIG. 14, it was recognized that the peak intensity of the CT complex observed at 300 nm to 500 nm was increased as the adsorbed amount of MV(Cl)₂ was increased in the MV(Cl)-BiPh-HMMs obtained in Examples 5 to 9.

Examples 10 to 14

The BiPh-HMM (50 mg) obtained in Synthesis example 1, and methylviologen dihexafluorophosphate (MV(PF₆)₂, initial concentration: 20 mM (Example 10), 40 mM (Example 11), 70 mM (Example 12), 100 mM (Example 13), 120 mM (Example 14)) were dispersed in acetonitrile (1 ml). The dispersion was stirred at room temperature for 1 hour.

Thereafter, the crystalline powders of each BiPh-HMM modified by methylviologen (MV(PF₆)-BiPh-HMM) was obtained by centrifuging (3500 rpm, 30 min).

Figure 15:
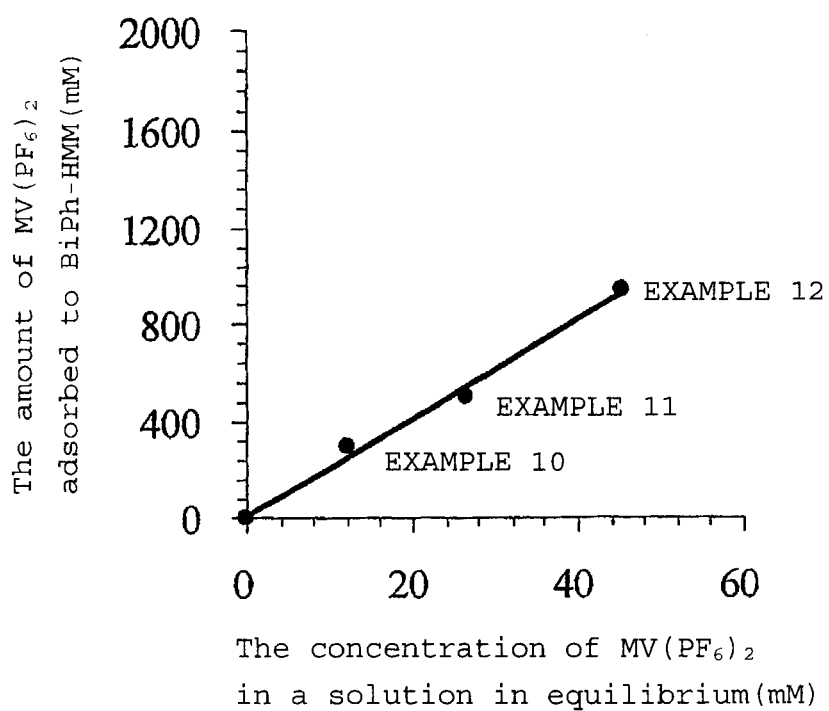
FIG. 15 is a graph showing the relationship between the concentration of $MV(PF_6)_2$ in a solution in equilibrium and the amount of $MV(PF_6)_2$ adsorbed to BiPh-HMM in Examples 10 to 12.
Figure 16:
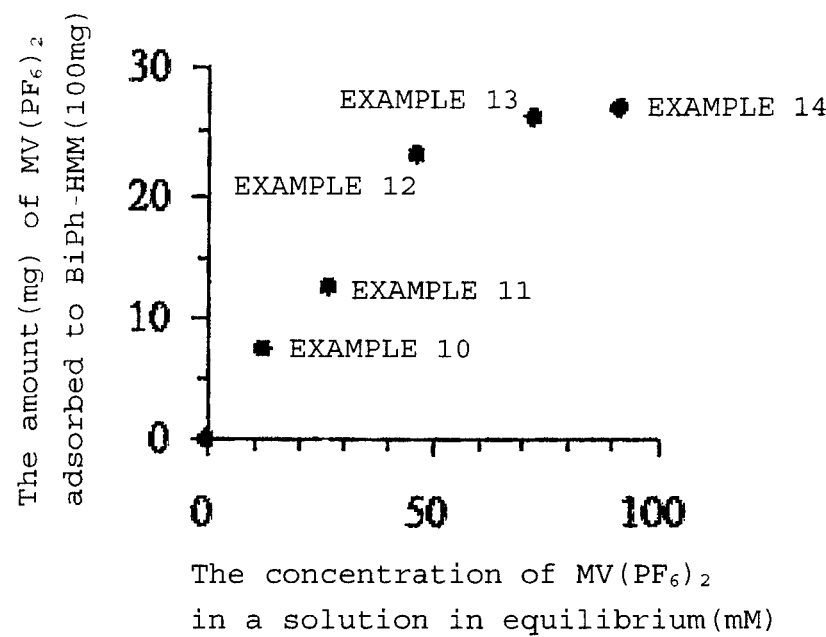
FIG. 16 is a graph showing the relationship between the concentration of $MV(PF_6)_2$ in the solution in equilibrium and the amount of $MV(PF_6)_2$ adsorbed to the BiPh-HMM in Examples 10 to 14.

To calculate the amount of MV(PF₆)₂ adsorbed to each MV(PF₆)-BiPh-HMM obtained in Examples 10 to 14, the weight of the MV(PF₆)₂ which was not adsorbed, and which was contained in the filtrate was measured, respectively. FIGS. 15 and 16 are graphs showing the relationship between the concentration of MV(PF₆)₂ in the solution in equilibrium and the amount of MV(PF₆)₂ adsorbed to the BiPh-HMM. As apparent from the results shown in FIGS. 15 and 16, a proportional relationship represented by the lines starting from the original points was recognized between the concentration of $MV(PF_6)_2$ in the solution in equilibrium and the amount of $MV(PF_6)_2$ adsorbed to the BiPh-HMM. In addition, by calculating the concentration of $MV(PF_6)_2$ adsorbed into the pore of the porous material based on the pore volume, it was recognized that the concentration was about 20 times as high as the concentration of $MV(PF_6)_2$ in the solution in equilibrium.

Figure 17:
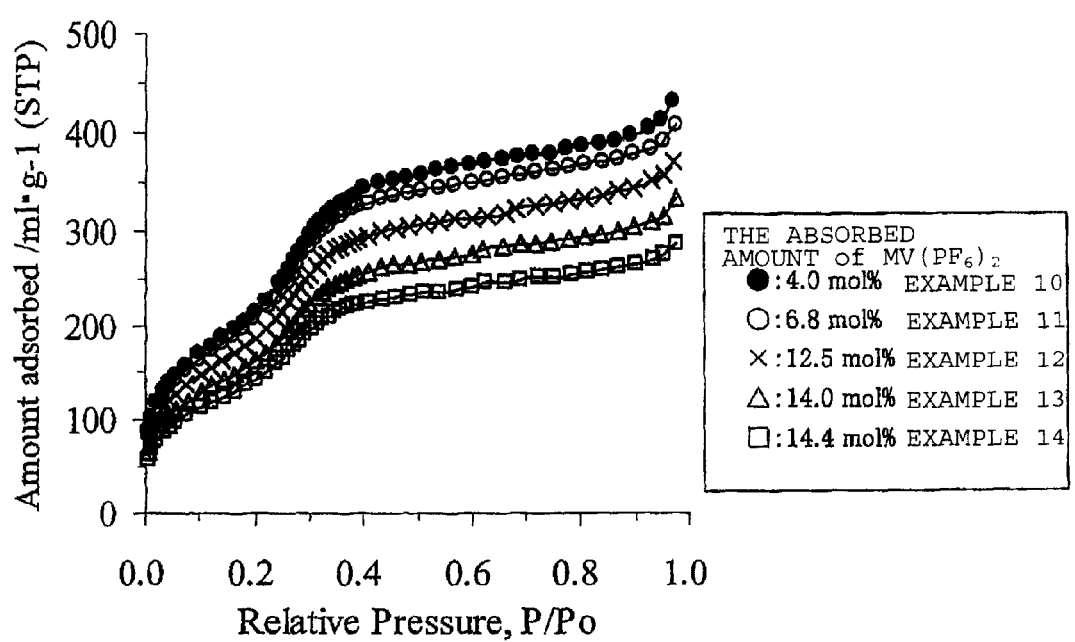
FIG. 17 is a graph showing nitrogen adsorption and desorption isotherms of $MV(PF_6)$-BiPh-HMMs obtained in Example 10 to 14.

Next, the adsorbed amounts of nitrogen to the $MV(PF_6)$-BiPh-HMMs obtained in Examples 10 to 14 were measured. FIG. 17 shows the nitrogen adsorption and desorption isotherms of the $MV(PF_6)$-BiPh-HMMs obtained in Examples 10 to 14. As apparent from the result shown in FIG. 17, it was recognized that the pore volume was reduced as the adsorbed amount of $MV(PF_6)_2$ was increased. It was recognized from this result that the $MV(PF_6)_2$ was adsorbed in the pore of the $MV(PF_6)$-BiPh-HMM obtained in Examples 10 to 14.

Figure 18:
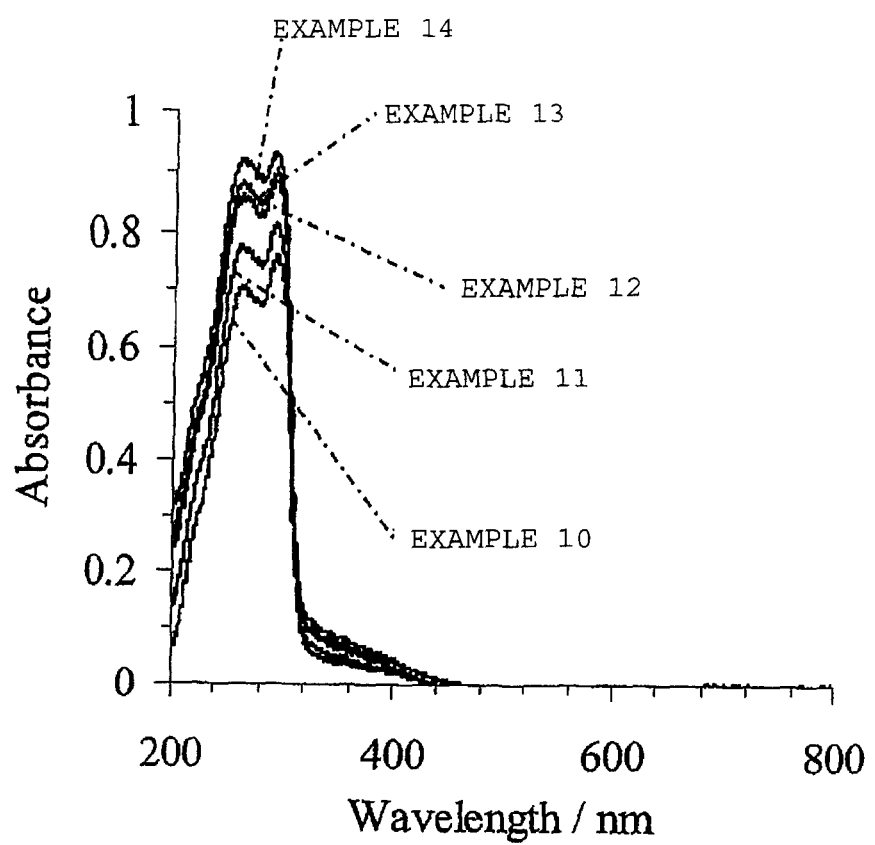
FIG. 18 is a graph showing UV/Vis spectra (diffuse reflection spectra) of the $MV(PF_6)$-BiPh-HMMs obtained in Example 10 to 14.

Next, the UV/Vis spectra (diffuse reflection spectra) of the $MV(PF_6)$-BiPh-HMMs obtained in Examples 10 to 14 was measured. FIG. 18 is a graph showing the obtained diffuse reflection spectra. As apparent from the result shown in FIG. 18, it was recognized that the peak intensity of the CT complex observed at 300 nm to 500 nm was increased as the adsorbed amount of mv $(PF_6)_2$ was increased in the $MV(PF_6)$-BiPh-HMM obtained in Examples 10 to 14.

Example 15

The crystalline powders (0.1 mg) of the BiPh-HMM obtained in Synthesis example 1 was added to a Tris-HCl buffer aqueous solution of $MV(PF_6)_2$ ($MV(PF_6)_2$: 1 mM, Tris: 50 mM, pH=7.4, 4.0 ml). The mixture was irradiated with ultrasonic waves at room temperature for about 2 minutes, and then stirred at room temperature to obtain a reaction solution. Subsequently, crystalline powders of BiPh-HMM supporting methylviologen ($MV(PF_6)$-BiPh-HMM) were obtained by filtering the reaction solution by centrifuging.

Example 16

FSM (1.06 g) was added to 0.1% by mass NaOH methanol solution (100 g). The mixture was maintained for 3 minutes, and then suction-filtered. Thereafter, the filtered matter was washed with methanol, and then dried in vacuum to obtain Na-FSM (500 mg) in which an anion site (Si—ONa) was constructed on the surface of the mesopore. Subsequently, the obtained Na-FSM (10 mg) and methylviologen dichloride [$MV(Cl)_2$:3 mg, 0.01 mmol] were mixed in methanol (0.5 ml). The mixture was reacted at room temperature for 1 hour. Thereafter, the reacted mixture was connected to a vacuum line. The solvent was slowly distilled at room temperature under a reduced pressure to obtain crystalline powders of FSM modified by methylviologen dichloride (MV(Cl)-Na-FSM).

Figure 19:
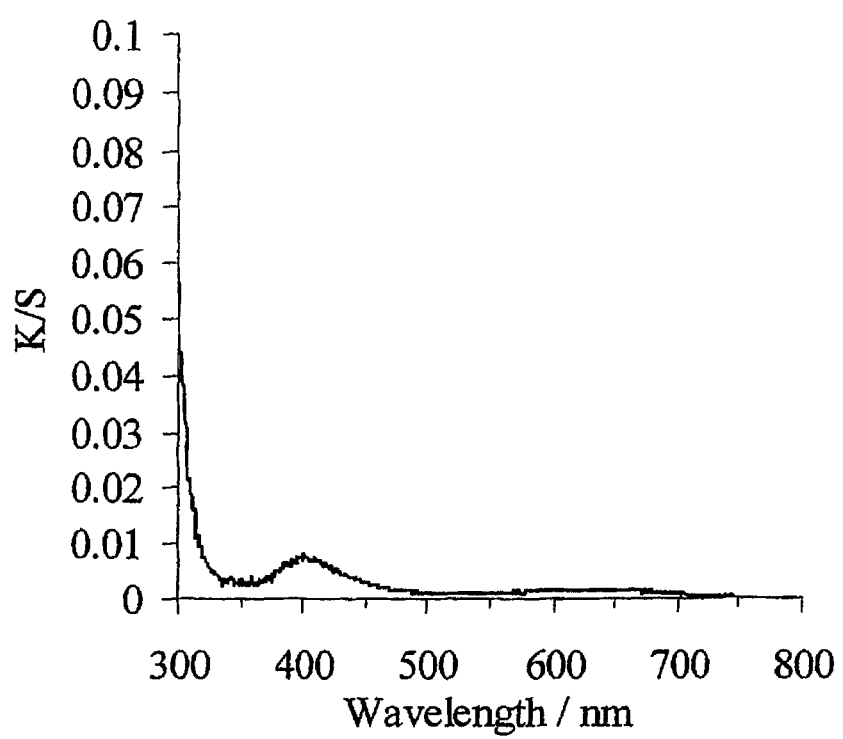
FIG. 19 is a graph showing a UV/Vis spectrum (diffuse reflection spectrum) of an integrating sphere of MV(Cl)-Na-FSM obtained in Example 16.

The UV/Vis spectrum (diffuse reflection spectrum) of the MV(Cl)-Na-FSM obtained in the above manner was measured using the integrating sphere. FIG. 19 is a graph showing the obtained diffuse reflection spectrum. As apparent from the result shown in FIG. 19, the peak characteristic to the CT complex was observed near 400 nm in the MV(Cl)-Na-FSM obtained in Example 16.

Comparative Example 1

FSM (10 mg) and methylviologen dichloride ($MV(Cl)_2$: 3 mg, 0.01 mmol) were mixed in methanol (0.5 ml). The mixture was reacted at room temperature for 1 hour. Thereafter, the reacted mixture was connected to a vacuum line. The solvent was slowly distilled at room temperature under a reduced pressure to obtain crystalline powders of FSM supporting methylviologen dichloride (MV(Cl)-FSM).

Figure 20:
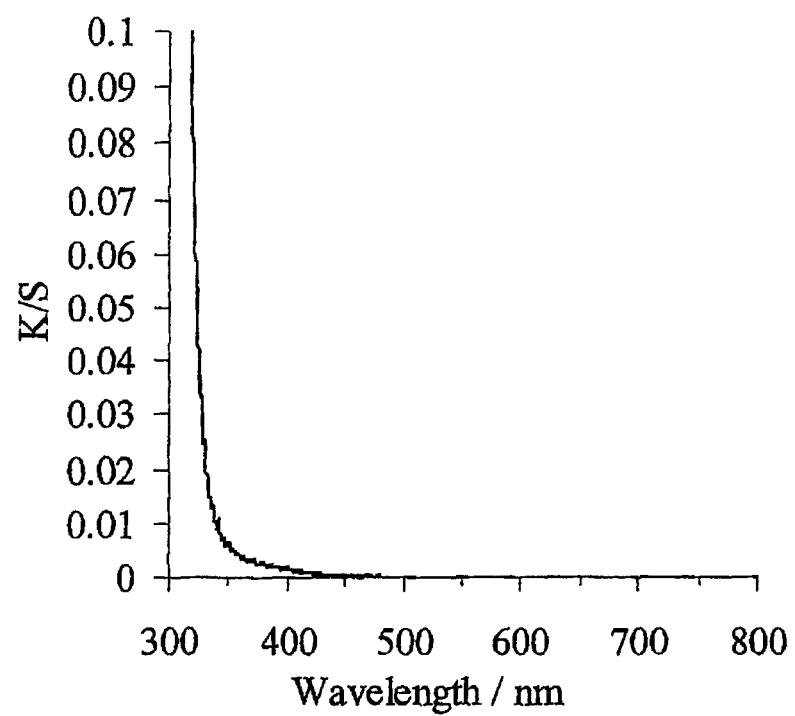
FIG. 20 is a graph showing a UV/Vis spectrum (diffuse reflection spectrum) of an integrating sphere of MV(Cl)-FSM obtained in Comparative example 1.

The UV/Vis spectrum (diffuse reflection spectrum) of the MV(Cl)-FSM obtained in the above manner was measured using the integrating sphere. FIG. 20 is a graph showing the obtained diffuse reflection spectrum. As apparent from the result shown in FIG. 20, the peak characteristic to the CT complex was hardly measured in the MV(Cl)-FSM obtained in Comparative example 1.

[Evaluation of Properties of SiVSi(I)-BiPh-HMM Obtained in Example 1]

Figure 21:
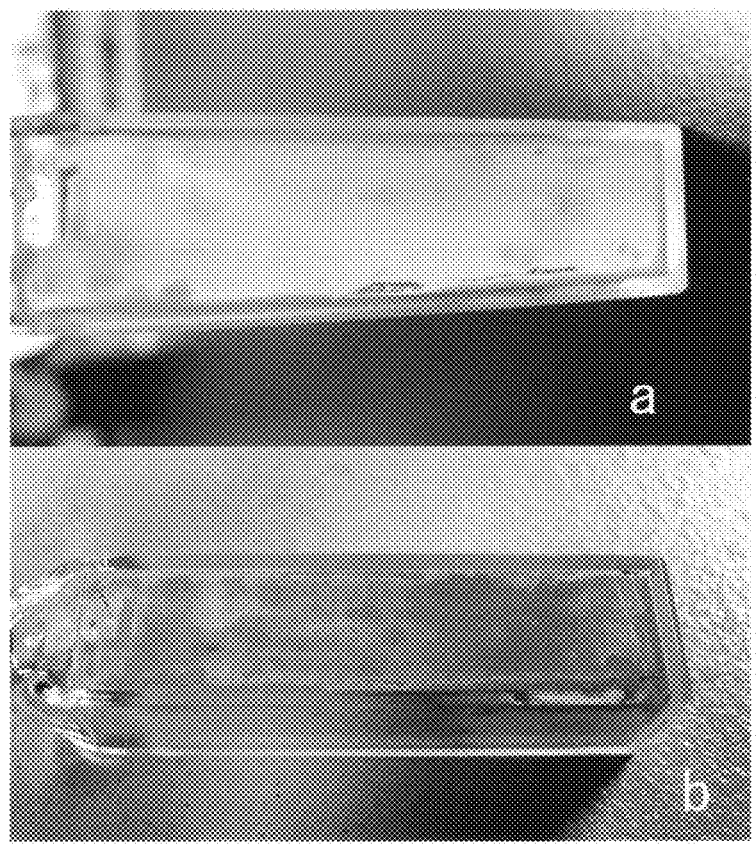
FIG. 21(a) is a photograph of a state before irradiation of a thin film formed on the inner wall of quartz cell by using the SiVSi(I)-BiPh-HMM (Example 1)
FIG. 21(b) is a photograph of state after irradiation of a thin film formed on the inner wall of quartz cell by using the SiVSi(I)-BiPh-HMM (Example 1).
Figure 22:
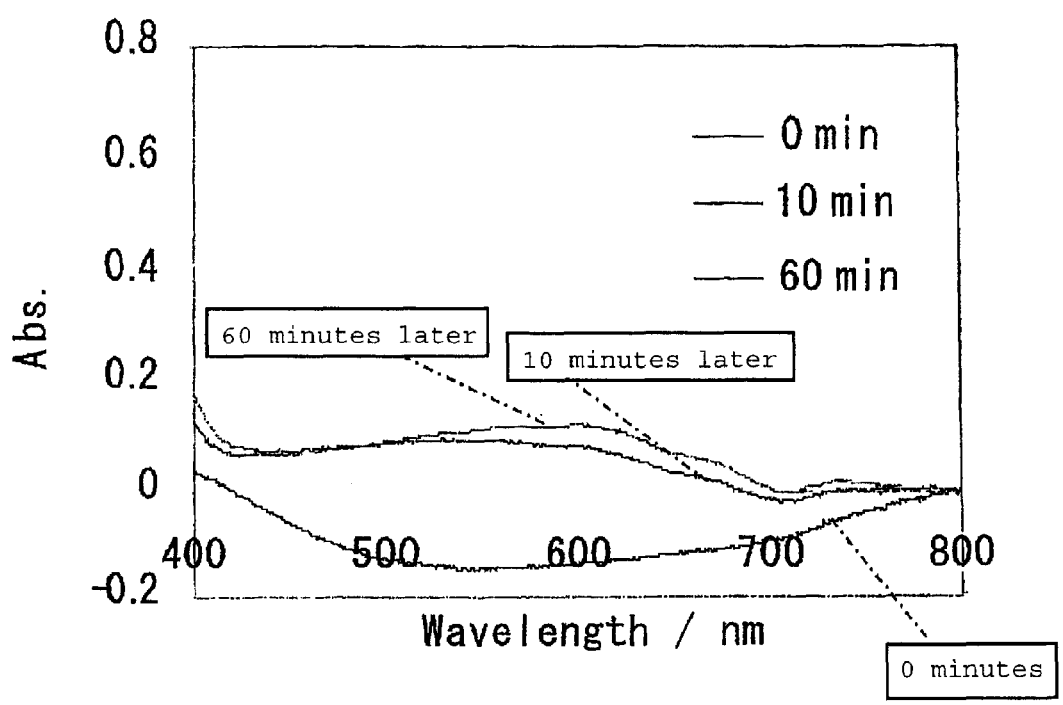
FIG. 22 is a graph showing UV/Vis spectra (diffuse reflection spectra) changes of SiVSi(I)-BiPh-HMM (Example 1) by irradiation.

The SiVSi(I)-BiPh-HMM (25 mg) obtained in Example 1 was added to ion-exchanged water (1.0 ml). The mixture was stirred at room temperature for 1 hour, and then filtered by centrifuging (3500 rpm, 30 minutes). A sample was formed by thinly coating the inner wall of a quartz cell (1 cm×1 cm×4.5 cm) having a screw cap with the obtained light yellow residue. Then, using the sample obtained in the above manner, the UV-VIS spectrum was measured every ten minutes under a vacuum deaeration condition while irradiating probe light having a wavelength of 800 nm. FIG. 21(*a*) shows the photograph of the SiVSi(I)-BiPh-HMM before the irradiation. FIG. 21(*b*) shows the photograph of the SiVSi(I)-BiPh-HMM after the irradiation. FIG. 22 shows the obtained UV-VIS spectra of each samples.

As apparent from the results shown in FIGS. 21 and 22, it was recognized that the SiVSi(I)-BiPh-HMM obtained Example 1 had a large absorption at 600 nm, and colored in blue by the light irradiation. From this result, it was recognized that viologen cation radical ($V^{•+}$) was formed by the light irradiation. On the other hand, for the purpose of comparison, the same experiment was carried out without the light irradiation. In this case, the absorption at 600 nm was not changed. When the sample colored in blue shown in FIG. 21(*b*) was exposed to air, the sample was color-faded in several minutes later, and returned to the original state.

From the results, it was recognized that the CT complex was excited by the light irradiation in the SiVSi(I)-BiPh-HMM obtained in Example 1, and thereby the charge transfer occurred from the biphenyl skeleton to viologen.

[Evaluation of Properties of SiVSi($PF_6$)-BiPh-HMM Obtained in Example 2]

Figure 23:
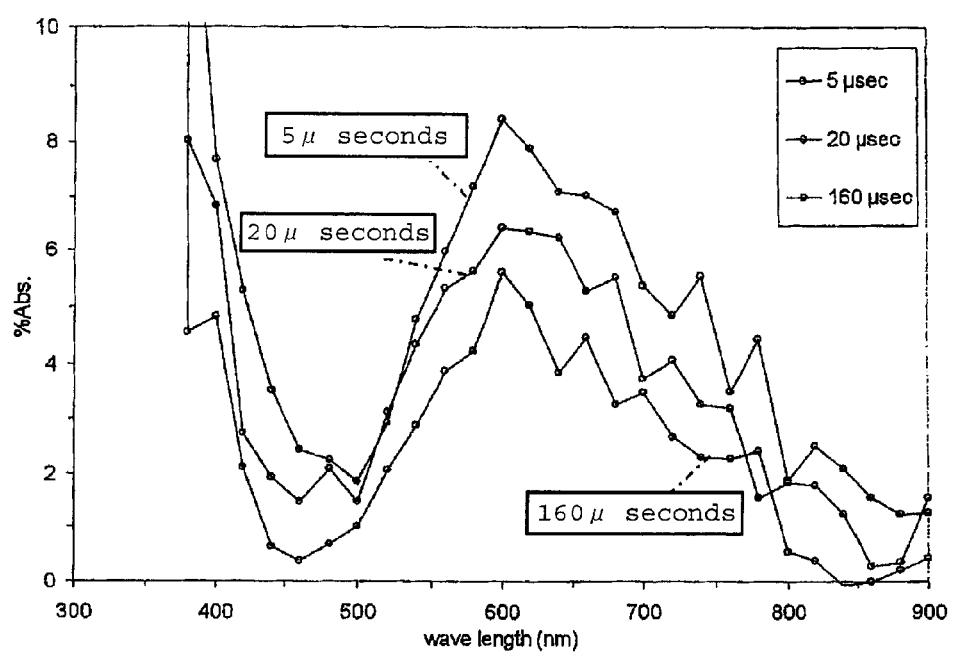
FIG. 23 is a graph showing time-resolved transient absorption spectra of $SiVSi(PF_6)$-BiPh-HMM (Example 2).

Using the SiVSi($PF_6$)-BiPh-HMM obtained in Example 2, a transient absorption spectrum was measured. Specifically, first, the SiVSi($PF_6$)-BiPh-HMM was substituted with argon and encapsulated in a quartz cell (2 mm×10 mm×45 mm) to forma sample for measurement. Then, while this sample was irradiated with pulse light having a wavelength of 355 nm, the change in absorption was measured 5µ second to 160µ second after the pulse light irradiation. The measurement was carried out at intervals of 20 nm over a wavelength range of 360 nm to 900 nm. FIG. 23 shows the time-resolved transient absorption spectra of the SiVSi($PF_6$)-BiPh-HMM.

As apparent from the result shown in FIG. 23, it was recognized that the SiVSi($PF_6$)-BiPh-HMM obtained in Example 2 showed an absorption by the viologen radical cation ($V^{•+}$) near 600 nm, by irradiating light having a wavelength of 355 nm to excite the CT complex. From this result, it was recognized that the charge transfer occurred from the biphenyl silica skeleton to viologen by irradiating light having a wavelength of 355 nm. In addition, it was recognized that the absorption of the formed $V^{•+}$ was gradually reduced after the irradiation.

Figure 24:
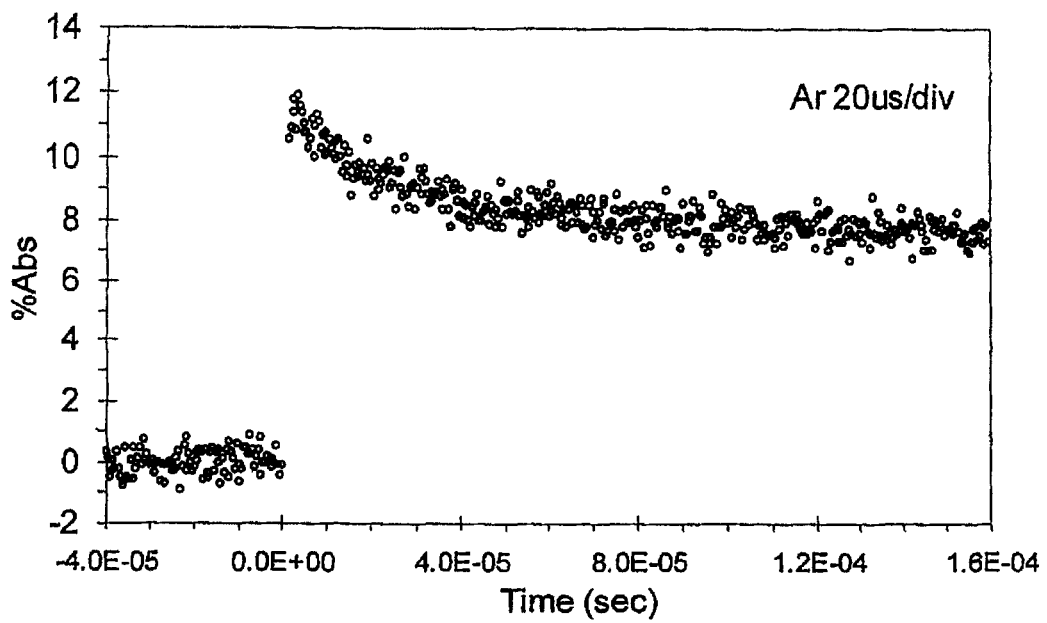
FIG. 24 is a graph showing the change in absorbance at 600 nm of the $SiVSi(PF_6)$-BiPh-HMM obtained in Example 2.
Figure 25:
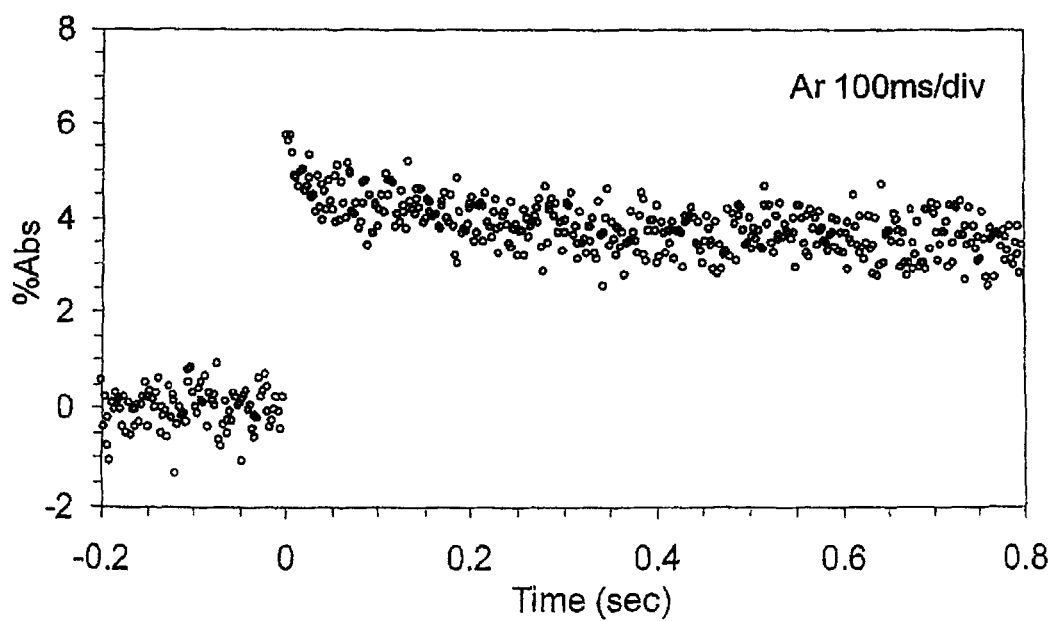
FIG. 25 is a graph showing the change in absorbance at 600 nm of the $SiVSi(PF_6)$-BiPh-HMM obtained in Example 2.
Figure 26:
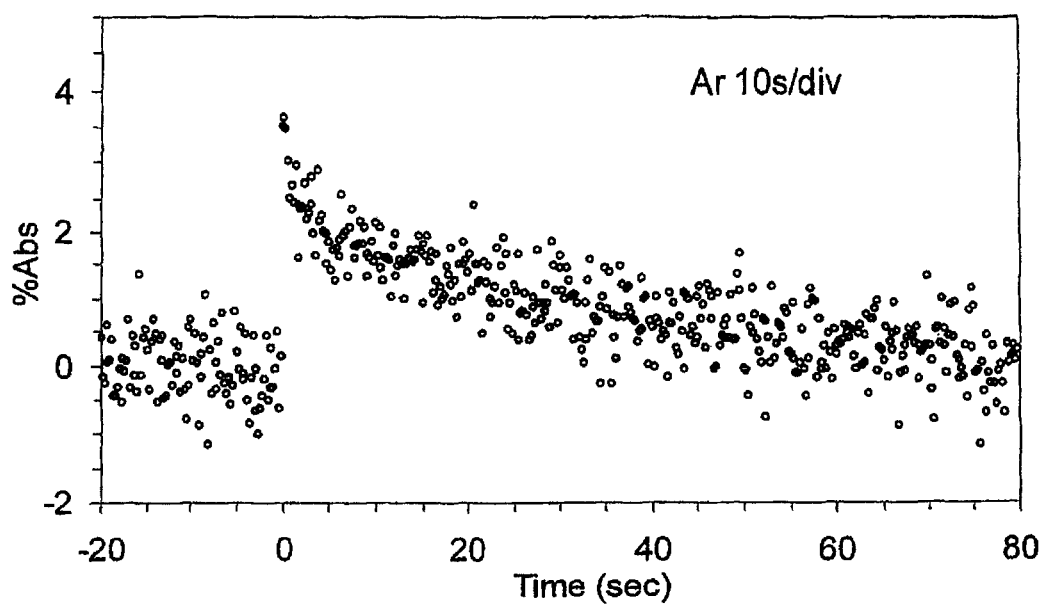
FIG. 26 is a graph showing the change in absorbance at 600 nm of the $SiVSi(PF_6)$-BiPh-HMM obtained in Example 2.

Next, using the SiVSi(PF$_6$)-BiPh-HMM obtained in Example 2, the lifetime of the charge separation state was measured from the change in the absorbance at 600 nm. Specifically, first, the SiVSi(PF$_6$)-BiPh-HMM was substituted with argon and encapsulated in a quartz cell (2 mm×10 mm×45 mm) to produce a sample for measurement. Then, the sample was irradiated with pulse light having a wavelength of 355 nm as excitation light to measure the change in the absorbance at 600 nm, and thus the lifetime of the charge separation state was measured. FIGS. 24 to 26 are graphs showing the change in the absorbance at 600 nm of the SiVSi(PF$_6$)-BiPh-HMM obtained in Example 2.

As apparent from the results shown in FIGS. 24 to 26, it was recognized that the lifetime of the charge separation state of the SiVSi(PF$_6$)-BiPh-HMM obtained in Example 2 was very long. From this result, it is estimated that the positive hole caused by the charge separation is migrated on the biphenyl skeleton in the SiVSi(PF$_6$)-BiPh-HMM obtained in Example 2.

[Measurement Test 1 on Formation Rate of Methylviologen Radical Cation]

Figure 27:
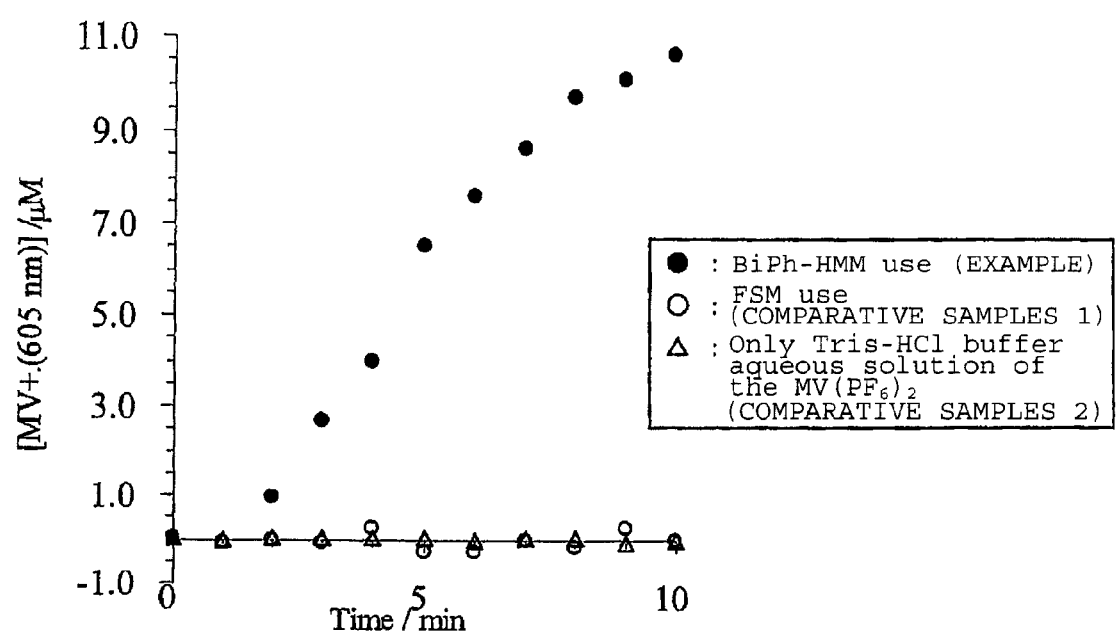
FIG. 27 is a graph showing the relationship between the photo irradiation time and the concentration of $MV^{\cdot+}$ of $MV(PF_6)$-BiPh-HMM and comparative samples 1 and 2.

A sample was formed using tris-ethanolamine as a positive hole reducing agent (sacrifice reagent). The formation rate of methylviologen radical cation was measured by irradiating the sample with light. Specifically, first, the crystalline powders (0.1 mg) of the BiPh-HMM obtained in Synthesis example 1 as a host molecule was added to the Tris-HCl buffer aqueous solution of the MV(PF$_6$)$_2$ (MV(PF$_6$)$_2$: 1 mM, Tris: 50 mM, pH=7.4, 4.0 ml) in a sample bottle. Then, ultrasonic waves were irradiated at room temperature for about 2 minutes until the host molecule was uniformly dispersed, and thereby a reaction solution was obtained. Subsequently, the reaction solution was introduced in a quartz cell having a light path length of 1 cm. Then, the quartz cell was hermetically sealed with a septum. Thereafter, argon bubbling was carried out as a deaeration operation for 20 minutes to obtain a sample for measurement. Then, the formation of MV$^{·+}$ was measured (605 nm) by irradiating the sample with laser light (18 mJ·cm$^{-2}$) having a wavelength of 355 nm. FIG. 27 is a graph showing the relationship between the time and the concentration of MV$^{·+}$. Note that, a method of producing such a reaction solution is the same as the one employed in Example 15. The MV(PF$_6$)-BiPh-HMM (Example) is formed in the reaction solution.

The formation of MV$^{·+}$ was measured in the same manner as above using: a sample (comparative sample 1) formed from the solution obtained by employing the same method as the above-described method except that FSM was used as a host molecule; and a sample (comparative sample 2) formed from only a Tris-HCl buffer aqueous solution of MV(PF$_6$)$_2$ without using a host molecule. FIG. 27 is a graph showing the relationship between the time and the concentration of MV$^{·+}$.

As apparent from the result shown in FIG. 27, it was recognized that the concentration of MV$^{·+}$ was increased in proportion to the irradiation time of excitation light having a wavelength of 355 nm in a reaction solution containing MV(PF$_6$)-BiPh-HMM. In addition, by calculating an initial reaction rate of MV$^{·+}$ based on the measured data, it was recognized that the initial reaction rate of M$^+$ was 1.6 μM/min. In contrast, the formation of MV$^{·+}$ was not observed in the cases of the comparative samples 1 and 2. From this result, it was recognized that the charge separation occurred by the CT complex formed of MV(PF$_6$)$_2$ and a biphenyl group.

[Measurement Test 2 on Formation Rate of Methylviologen Radical Cation]

Figure 28:
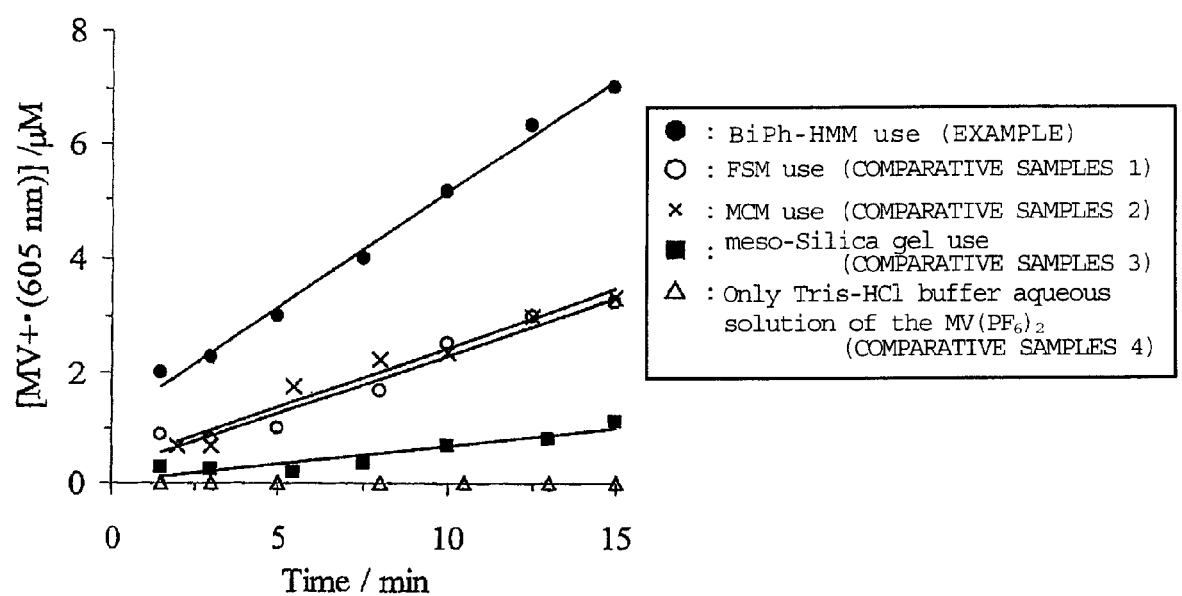
FIG. 28 is a graph showing the relationship between the photo irradiation time and the concentration of MV$^{·+}$ of MV(PF$_6$)-BiPh-HMM and comparative samples 1 to 4.

A sample was formed using tris-ethanolamine as a positive hole reducing agent (sacrifice reagent). The formation rate of methylviologen radical cation was measured by irradiating the sample with light. Specifically, first, the Tris-HCl buffer aqueous solution of the MV(PF$_6$)$_2$ (MV(PF$_6$)$_2$: 1 mM, Tris: 50 mM, pH=7.4, 4.0 ml) and the crystalline powders (0.1 mg) of the BiPh-HMM obtained in Synthesis example 1 as a host molecule were added in a 20 ml sample bottle. Then, ultrasonic waves were irradiated at room temperature for about 2 minutes until the host molecule was uniformly dispersed, and thereby a reaction solution was obtained (Example). Subsequently, the reaction solution was introduced in a quartz cell having a light path length of 1 cm. Then, the quartz cell was hermetically sealed with a septum. Thereafter, argon bubbling was carried out as a deaeration operation for 20 minutes to obtain a sample for measurement. Then, the formation of MV$^{·+}$ was observed (605 nm) by irradiating the sample with light having a long wavelength of more than 310 nm to the sample using a 150 W xenon lamp in order to photo-excite only the CT complex. FIG. 28 is a graph showing the relationship between the time and the concentration of MV$^{·+}$. Note that, a method of producing such a reaction solution is the same as the one employed in Example 15. The MV(PF$_6$)-BiPh-HMM (Example) is formed in the reaction solution.

The formation of MV$^{·+}$ was measured in the same manner as above using: a sample (comparative sample 1) formed from the solution obtained by employing the same method as the above-described method except that FSM was used as a host molecule; a sample (comparative sample 2) formed from the solution obtained by employing the same method as the above-described method except that MCM was used as a host molecule; a sample (comparative sample 3) formed from the solution obtained by employing the same method as the above-described method except that a silica gel containing mesopores for a column chromatography was used as a host molecule; and a sample (comparative sample 4) formed from only a Tris-HCl buffer aqueous solution of MV(PF$_6$)$_2$ without using a host molecule. FIG. 28 is a graph showing the relationship between the time and the concentration of MV$^{·+}$.

As apparent from the result shown in FIG. 28, it was recognized that, when the BiPh-HMM was used as a host molecule, MV$^{·+}$ was formed, and the concentration thereof was increased. In addition, by calculating from the obtained data, the initial reaction rate was 0.40 μM/min in the case where the BiPh-HMM was used as a host molecule.

On the other hand, it was recognized that, in the case where a host molecule was not present (comparative sample 4), MV$^{·+}$ was not formed, even when methylviologen was directly photo-excited. It was understood that, in the case where the FSM was used as a host molecule (comparative sample 1), MV$^{·+}$ was formed slowly, and the initial reaction rate was 0.20 μM/min. Furthermore, it was understood that, in the case where the MCM was used as a host molecule (comparative sample 2), MV$^{·+}$ was formed slowly, the initial reaction rate was 0.21 μM/min. In addition, it was recognized that, in the case where the silica gel containing mesopores for a column chromatography was used (comparative sample 3) also, MV$^{·+}$ was formed; however, it was understood that the initial reaction rate was 0.066 μM/min. It was understood from these results that MV$^{·+}$ was formed slowly in the comparative samples 1 to 4 as compared to the case where the BiPh-HMM was used as a host molecule. Moreover, it was understood that the highest reaction rate among the comparative samples was about a half of the reaction rate obtained when the BiPh-HMM was used. From these results, it was also recognized that the charge separation was efficiently progressed by disposing an electron acceptor [$MV(PF_6)$] in the pore and the like of the porous material (BiPh-HMM) which includes an electron donor in the skeleton. It was understood that the light energy conversion efficiency was sufficiently improved as compared to the cases where the FSM and MCM were used.

Figure 29:
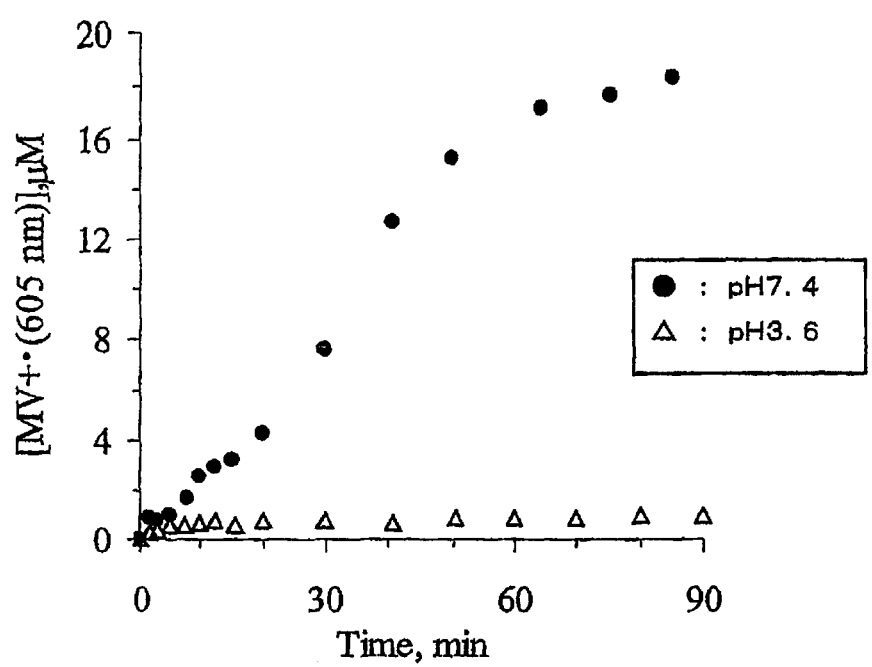
FIG. 29 is a graph showing the relationship between the photo irradiation time and the concentration of MV$^{·+}$ of comparative sample 1 at pH 3.6 or 7.4.

Next, the same measurement was carried out under an acidic condition (pH 3.6) using the comparative sample 1 obtained by using the FSM as a host molecule. FIG. 29 is a graph showing the relationship between the time and the concentration of $MV^{·+}$ at pH 3.6 or pH 7.4. As apparent from the result shown in FIG. 29, it was recognized that the concentration of $MV^{·+}$ was slightly increased even under the acidic condition in the comparative sample 1.

Figure 30:
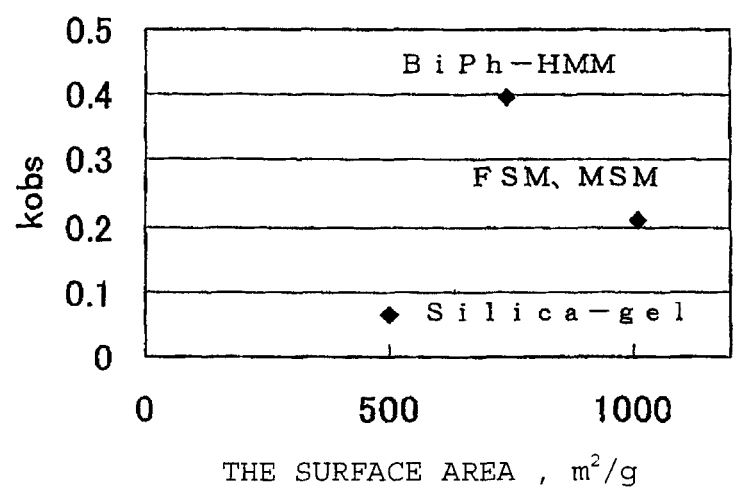
FIG. 30 is a graph showing the relationship between the reaction rate and the pore surface areas of BiPh-HMM, FSM, MSM, and silica gel containing mesopores.

The relationship between the reaction rate and the pore surface area of the host molecules (BiPh-HMM, FSM, MSM, and mesopore-containing silica gel) was indicated by plotting the values (FIG. 30). From the result shown in FIG. 30, it was understood that the formation rate of $MV^{·+}$ tended to be higher in proportion to the surface area when the inorganic porous material was used.

Synthesis Example 4

First, a surfactant (octadecyltrimethylammonium chloride, 1.83 g) was completely dissolved in water (100 g). Thereafter, an aqueous solution of sodium hydroxide (6 mol/L, 10 mL) was added to the mixture to obtain a solution. Subsequently, 4,4'-bis(triethoxysilyl)biphenyl (2.0 g) was slowly added as a silica source to the obtained solution, and continuously stirred at room temperature for 20 hours. Then, the solution was left at rest while being subjected to a aging process (100° C., 24 hours). Thereafter, the obtained reaction liquid was filtered, and washed to obtain a silica porous material modified by the biphenyl group (BiPh-HMM) which contained the surfactant. Subsequently, by dispersing the BiPh-HMM containing the surfactant in hydrochloric acid-ethanol solution (10 g hydrochloric acid/300 mL ethanol) which had been heated at 80° C., a process to extract and remove the surfactant was repeated twice to obtain crystalline powders of the silica porous material modified by the biphenyl group (BiPh-HMM).

Figure 31:
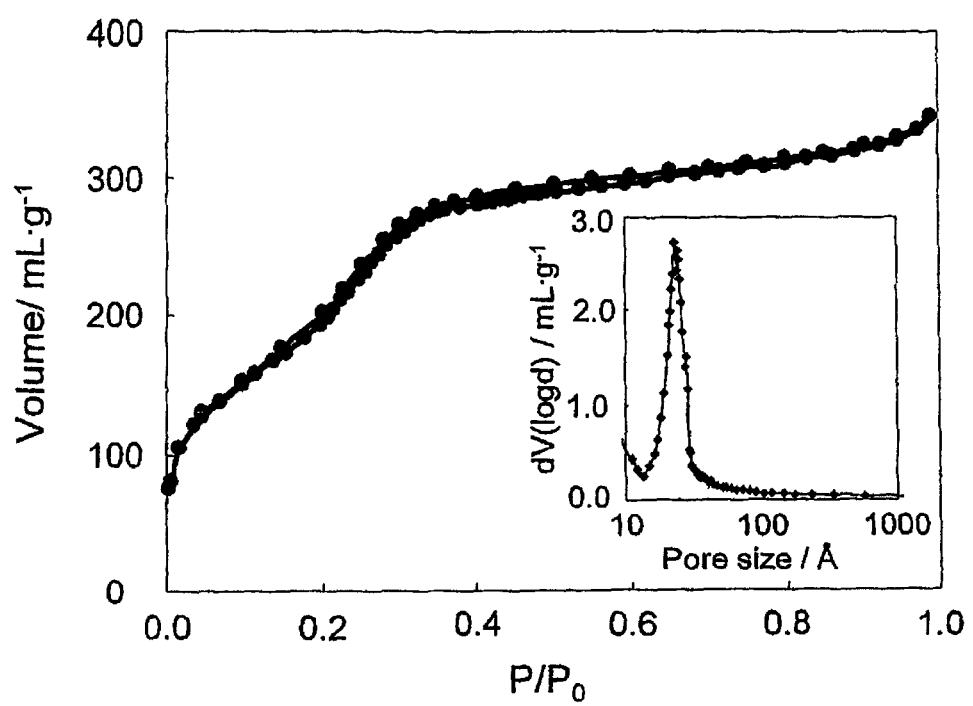
FIG. 31 is a graph showing a nitrogen adsorption and desorption isotherm and a pore diameter distribution curve of the crystalline powders of BiPh-HMM obtained in Synthesis example 4.

FIG. 31 shows the nitrogen adsorption and desorption isotherm and pore diameter distribution curve of the obtained crystalline powders of the BiPh-HMM. As apparent from the result shown in FIG. 31, it was recognized that the obtained BiPh-HMM showed the typical type IV of the adsorption and desorption isotherm in the mesoporous material thereof. Based on the calculation from the adsorption isotherm shown in FIG. 31, the pore surface area (BET) was 776 $m^2/g$, and the pore volume was 0.68 mL/g. From the pore diameter distribution curve shown in FIG. 31, it was recognized that mesopores having a uniform size of 2.3 nm were present in the obtained BiPh-HMM.

Figure 32:
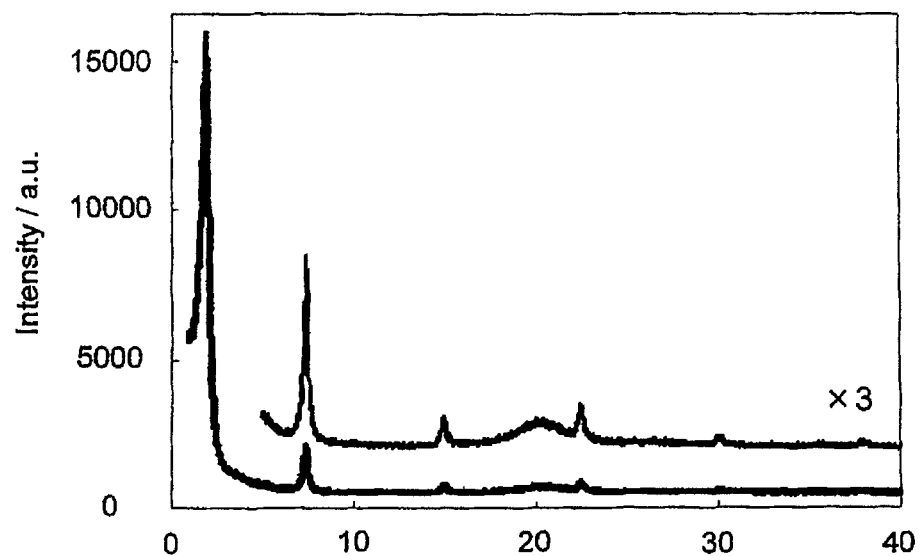
FIG. 32 is a graph showing an XRD pattern of the crystalline powders of the BiPh-HMM obtained in Synthesis example 4.

Next, the obtained BiPh-HMM crystalline powders were measured by the X-ray diffraction (XRD). FIG. 32 shows the XRD pattern of the BiPh-HMM crystalline powders obtained in Synthesis example 4. As apparent from the result shown in FIG. 32, it was recognized from the diffraction pattern observed in a low angle region (near) 1.9° that the BiPh-HMM (Synthesis example 4) had a two-dimensional hexagonal structure in which the cylindrical mesopores with uniform sizes was arranged in a honeycomb pattern. In addition, it was recognized from a periodic diffraction pattern at 5° or over (7.4°, 14.9°, 22.5°, 30.1°) that the biphenyl groups were regularly arranged in the silica skeleton of the BiPh-HMM (Synthesis example 4), resulting in the formation of a crystalline layer structure in a molecular scale.

Example 17

First, the 4,4'-bipyridine derivative (N,N'-Bis(3-trimethoxysilanyl)propyl)-4,4'-bipyridiniu m diiodide) obtained in Synthesis example 3 was added to 100 mL of anhydrous acetonitrile. The mixture was dissolved while stirring at room temperature to obtain a solution. Then, the BiPh-HMM (0.30 g) obtained in Synthesis example 4 was subjected to a dehydration process for 1 hour at a temperature condition of 150° C. under an evacuation condition. Subsequently, the dehydrated BiPh-HMM (0.30 g) was added to the supernatant solution (80 mL) of 4,4'-bipyridine derivative solution prepared in the above manner. The mixture was heated (90° C., 2 hours) in an inert gas atmosphere, and then filtered to recover a reaction product. Thereafter, the obtained reaction product was dispersed in anhydrous acetonitrile (100 mL), and then subjected to a heating process (90° C., 1 hour) to extract an unreacted 4,4'-bipyridine derivative from the BiPh-HMM. Then, the obtained reaction product was washed with anhydrous ethanol (100 mL), and washed with water (100 mL) to obtain crystalline powders of BiPh-HMM modified by viologen (SiVSi(I)-BiPh-HMM).

Figure 33:
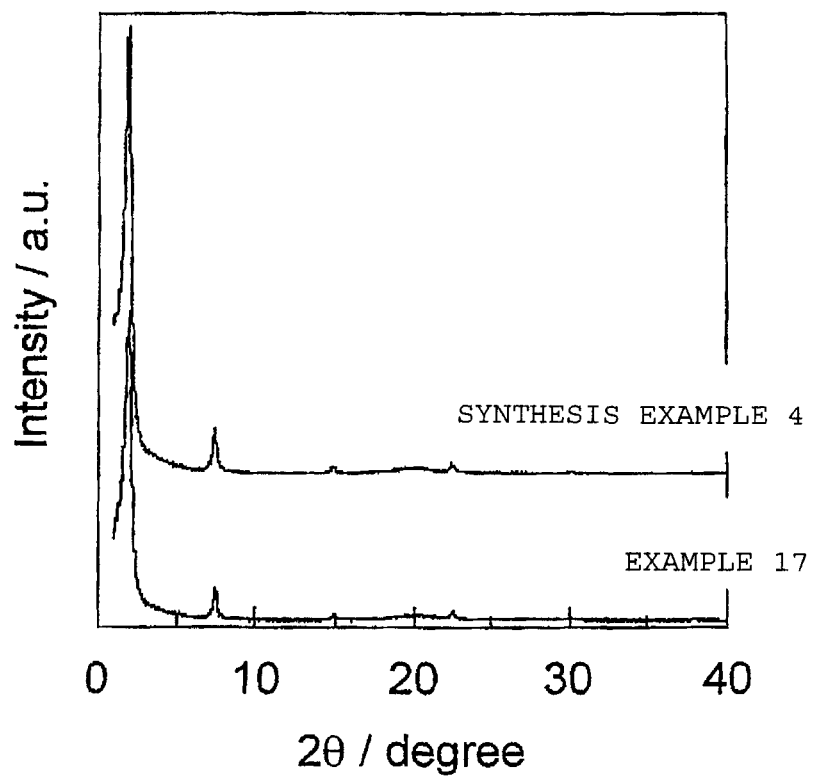
FIG. 33 is a graph showing an XRD pattern of SiVSi(I)-BiPh-HMM (Example 17) and BiPh-HMM (example 4).

The SiVSi(I)-BiPh-HMM obtained in Example 17 and the BiPh-HMM obtained in Synthesis example 4 were measured by the X-ray diffraction. FIG. 33 shows the XRD patterns of the SiVSi(I)-BiPh-HMM obtained in Example 17 and the BiPh-HMM obtained in Synthesis example 4. From the result shown in FIG. 33, the diffraction pattern in a low angle region indicating the regular arrangement of the mesopores and the diffraction pattern in a high angle region indicating the periodic structure of biphenyl group in the silica skeleton were recognized in any of the samples in comparison with the diffraction patterns of the samples before and after the modification by viologen. As a result, it was recognized that the pore structure and the crystalline molecular arrangement were maintained in the SiVSi(I)-BiPh-HMM in which the surfaces of the pores and the like are modified by viologen.

Figure 34:
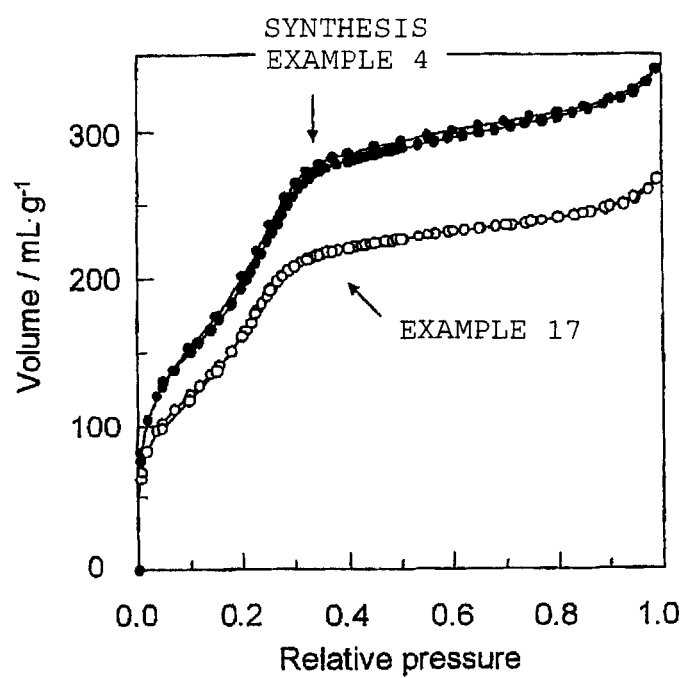
FIG. 34 is a graph showing a nitrogen adsorption and desorption isotherm of the SiVSi(I)-BiPh-HMM (Example 17) and BiPh-HMM (example 4).
Figure 35:
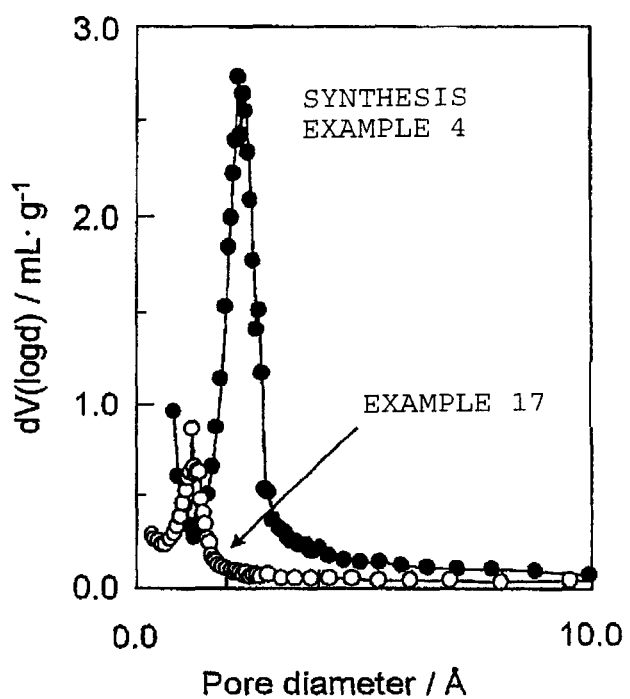
FIG. 35 is a graph showing a pore diameter distribution curve of the SiVSi(I)-BiPh-HMM (Example 17) and BiPh-HMM (example 4).

Next, the adsorbed amount of nitrogen to the SiVSi(I)-BiPh-HMM obtained in Example 17 was measured. FIG. 34 shows the obtained nitrogen adsorption and desorption isotherm of the SiVSi(I)-BiPh-HMM. FIG. 35 shows the pore diameter distribution curve thereof.

As apparent from the result shown in FIG. 34, it was recognized that the SiVSi(I)-BiPh-HMM obtained in Example 17 maintained the typical type IV of the adsorption and desorption isotherm in the mesoporous material. In addition, based on the calculation from the adsorption isotherm shown in FIG. 34, the pore surface area (BET) was 672 $m^2/g$, and the pore volume was 0.32 mL/g. On the other hand, the BiPh-HMM obtained in Synthesis example 4 had the pore surface area (BET) of 776 $m^2/g$ and the pore volume of 0.68 mL/g as described above. It was recognized that the pore volume was reduced to about a half, while the surface area was not significantly changed, by disposing viologen. It was recognized from this result that the bulk-raised bipyridyl derivative (viologen) was fixed on the surface of the pore in the SiVSi(I)-BiPh-HMM (Example 17).

As apparent from the result shown in FIG. 35, it was recognized that the uniformity of the pore was maintained in the SiVSi(I)-BiPh-HMM (Example 17) when the pore diameter distribution of the SiVSi(I)-BiPh-HMM obtained in Example 17 was compared with that of the BiPh-HMM obtained in Synthesis example 4. In addition, it was recognized that the average pore diameter was reduced from 2.3 nm to 1.4 nm by modification with viologen. It was recognized from this result that the pore surface of the SiVSi(I)-BiPh-HMM was uniformly modified by the bipyridyl derivative (viologen). Moreover, it was recognized that the bipyridyl derivative was introduced on the surface of the skeleton of the SiVSi(I)-BiPh-HMM obtained in Example 17 when the solid NMR measurement was carried out.

Next, a catalyst was produced using the SiVSi(I)-BiPh-HMM obtained in Example 17, and a hydrogen generation test was carried out in the following manner.

(Production of Catalyst)

The SiVSi(I)-BiPh-HMM (0.45 g) obtained in Example and an aqueous solution of chloroplatinic acid (platinum content: 2.3 mmol) were introduced in an evaporation dish. Thereafter, 30 mL of ethanol was further added thereto. The mixture was heated to 50° C., and stirred for 2 hours to obtain a solution. Then, the solution was evaporated slowly in a hot-water bath of 100° C. to impregnation-support a platinum salt to the SiVSi(I)-BiPh-HMM to obtain a sample. Thereafter, the obtained sample was subjected to a platinum reduction process in which the sample was heated to 200° C. under hydrogen gas of 100 Torr to obtain a catalyst supporting 1% by weight of platinum (Pt-SiVSi(I)-BiPh-HMM).

(Hydrogen Generation Test 1)

A hydrogen generation test was carried out using a reaction cell connected to a closed-circulatory reaction system. A purified gas was qualified and quantified with a gas chromatography. Such a closed-circulatory reaction system is manufactured using a glass tube, and connected to a vacuum pump, a pressure gauge, a gas circulator, and the gas chromatography. The atmosphere in the reaction system can be freely controlled.

In the hydrogen generation test, first, a mixed solution of water (400 mL), triethanolamine (21 mL) and hydrochloric acid (10 mL) was introduced in the reaction cell. Then, 0.1 g of the catalyst (Pt-SiVSi(I)-BiPh-HMM) was dispersed in the mixed solution. Subsequently, the reaction cell was connected to the closed-circulatory system to perform a deaeration process. The air in the system and the dissolved oxygen in the solution were removed. Thereafter, using a 450 W high pressure mercury lamp as a light source, and using an aqueous solution of sodium nitrite as a filter, the visible light having a wavelength of 400 nm or over was irradiated from the inside of the reaction cell to analyze the gas after a reaction time of 18 hours. It was recognizes from the result of this analysis that 2.6 µmol of hydrogen gas was generated.

(Hydrogen Generation Test 2)

Another hydrogen generation test was carried out using the same apparatus as that used in the hydrogen generation test 1. Specifically, a mixed solution of water (200 mL), triethanolamine (10.5 mL) and hydrochloric acid (6 mL) was introduced in a reaction cell. Then, 0.1 g of the catalyst (Pt-SiVSi (I)-BiPh-HMM) was dispersed in the mixed solution. Subsequently, the reaction cell was connected to the closed-circulatory system to perform a deaeration process. The air in the system and the dissolved oxygen in the solution were removed. Thereafter, using a 300 W xenon lamp as a light source, the light having a wavelength of 380 nm or less was irradiated from the above to analyze the gas after a reaction time of 22 hours. It was recognizes from the result of this analysis that 1.2 µmol of hydrogen gas was generated.

Figure 36:
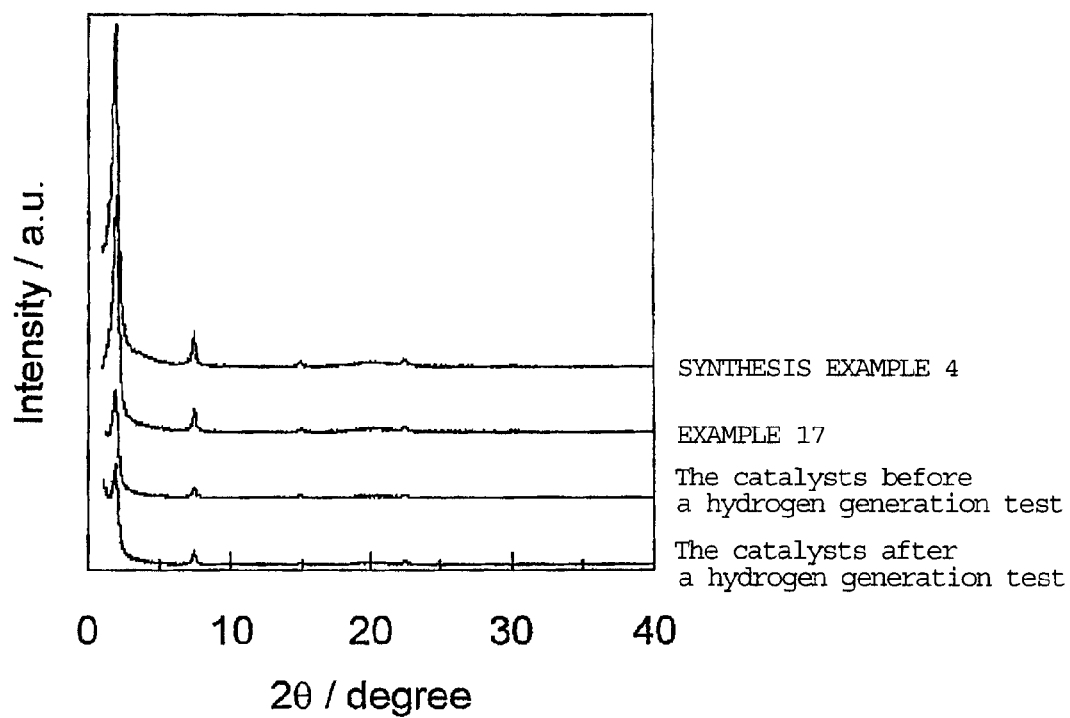
FIG. 36 is a graph showing XRD patterns of Pt-SiVSi(I)-BiPh-HMM before and after a hydrogen generation test, BiPh-HMM (Synthesis example 4), and SiVSi(I)-BiPh-HMM (Example 17).

Next, the catalysts (Pt-SiVSi(I)-BiPh-HMM) before and after the hydrogen generation test were measured by the X-ray diffraction measurement. FIG. 36 shows the XRE patterns of: the Pt-SiVSi(I)-BiPh-HMMs before and after the hydrogen generation test; the BiPh-HMM obtained in Synthesis example 4; and the SiVSi(I)-BiPh-HMM obtained in Example 17. As apparent from the result shown in FIG. 36, it was recognized that the diffraction pattern in a low angle region indicating the regular arrangement of the pores was maintained in the catalyst (Pt-SiVSi(I)-BiPh-HMM) before the hydrogen generation test. In addition, it was recognized that the diffraction pattern in a high angle region indicating the periodic structure of the biphenylene groups in the silica skeleton was maintained. The change in a signal intensity was hardly observed in the catalyst (Pt-SiVSi(I)-BiPh-HMM) after the hydrogen generation test, also. It was recognized from this result that the porous structure reflecting the micelle structure of a surfactant and the crystalline arrangement structure of the biphenylene groups were very stable to the hydrogen generation reaction. Thus, it was recognized from this that the light energy conversion material of the present invention had a high stability and excellent durability.

Synthesis Examples 5 and 6

First, 6.7 g of a surfactant (trimethyloctadecylammonium chloride) was dissolved in a mixed liquid of water (240 ml) and a 6M aqueous solution of sodium hydroxide (18 ml) to obtain first mixed solutions.

Then, the mixed liquids containing 4,4'-triethoxysilylbiphenyl and 2,2'-bipyridine derivative having a methoxysilyl group (4-[4-[3-(Trimethoxysilanyl)propylsulfanyl]butyl]-4-me thyl-2,2'-bipyridinyl: hereinafter referred to as "BiPy'"), the total amount of which was 16.8 mmol (Synthesis example 5: the mixing ration of BiPy' was 30 mol %, Synthesis example 6: the mixing ration of BiPy' was 50 mol %) were added dropwise into the first mixed solutions while stirring at room temperature (25° C.) to obtain second mixed solutions. Subsequently, the irradiation with ultrasonic waves for 3 minutes and the stirring for 10 seconds minutes were repeated 10 times to the obtained second mixed solutions. Thereafter, the solutions were stirred at room temperature (25° C.) for 18 hours to obtain reaction solutions. The obtained reaction solutions were heated at a temperature condition of 95° C. for 20 hours to obtain silica porous materials containing the surfactant (BiPh-HMM containing the surfactant). Then, the BiPh-HMM (1 g) containing the surfactants were suspended in a mixed liquid containing ethanol (200 ml) and concentrated hydrochloric acid (9 g) to obtain first suspended solutions. Then, the first suspended solutions were heated at a temperature condition of 75° C. overnight to extract the surfactants from the surfactant-containing BiPh-HMMs. Thereafter, the first suspended solutions were filtered to separate powders therefrom to obtain BiPh-HMM powders introduced with protonated bipyridine.

Next, 1 g of the BiPh-HMM powders introduced with the protonated bipyridine were suspended in 20 ml of ethanol solution containing 0.5 M triethylamine to obtain second suspended solutions. The obtained second suspended solutions were then stirred at normal temperature (25° C.) overnight to neutralize the protonated bipyridine. Thereafter, the second suspended solutions were filtered to separate powders. The obtained powders were dried in vacuum to obtain powders of silica porous materials introduced with bipyridine (BiPy'-BiPh-HMM). Note that, the content ratio of bipyridine introduced in the BiPy'-BiPh-HMM obtained in Synthesis examples 5 and 6 depended on the mixing ratio of the BiPy' in the mixed liquid containing the aforementioned 4,4'-triethoxysilylbiphenyl and 2,2'-bipyridine derivative having a methoxysilyl group. It was recognized from the result of the element analysis for the S atom that the content ratios were 0.47 mmol/g, (Synthesis example 5) and 0.78 mmol/g (Synthesis example 6).

Example 18

50 mg of the BiPy'-BiPh-HMM obtained in Synthesis example 5, 17.3 mg of Re(CO)$_5$(PPh$_3$) (CF$_3$SO$_3$), and 10 ml of toluene were mixed. An argon gas was passed therethrough for 20 minutes. Thereafter, the mixture was heated under reflux for 5 hours to obtain powders. The obtained powders were separated by filtration, washed with toluene, acetone, ethanol, acetone and diethylether in this order, and dried in vacuum to obtain BiPh-HMM to which a rhenium complex was fixed (Re(PPh$_3$)(CO)$_3$BiPy'-BiPh-HMM).

Example 19

By employing the same method as that used in Example 18 except that 50 mg of the BiPy'-BiPh-HMM obtained in Synthesis example 6 and 28.9 mg of Re(CO)$_5$(PPh$_3$) (CF$_3$SO$_3$) were used, BiPh-HMM to which a rhenium complex was fixed (Re(PPh$_3$)(CO)$_3$BiPy'-BiPh-HMM) was obtained.

[Evaluation of Properties of Re(PPh$_3$)(CO)$_3$BiPy'-BiPh-HMMs obtained in Examples 18 to 19]

The luminescence quantum yields of the Re(PPh$_3$)(CO)$_3$ BiPy'-BiPh-HMMs obtained in Examples 18 to 19 were measured. Such measurement was carried out using a sample prepared by dispersing 1 mg of each of the Re(PPh$_3$)(CO)$_3$ BiPy'-BiPh-HMM powders in 4 ml of acetonitrile, by passing an argon gas therethrough for 20 minutes, and then by hermetically sealing the resultant mixture in a container (quartz-made cell). The luminescence quantum yield of each Re (PPh$_3$) (CO)$_3$BiPy'-BiPh-HMM was 0.03 when excited with the light having a wavelength of 265 nm. At this time, only the luminescence from the rhenium complex was observed. On the other hand, the luminescence quantum yield of each Re (PPh$_3$) (CO)$_3$BiPy'-BiPh-HMM was 0.05 when excited with the light having a wavelength of 350 nm. At this time, only the luminescence from the rhenium complex was observed. It was understood from this result that, when the BiPh in the skeleton of the porous material was excited with the light having a wavelength of 265 nm, the energy transfer to the rhenium complex occurred, and the luminescence from the rhenium complex was observed. When the BiPh in the skeleton of the porous material was excited with the light having a wavelength of 265 nm, the energy transfer efficiency to the rhenium complex does not reach 100% irrespective of the fact that the luminescence from the BiPh was completely quenched. For this reason, it is estimated that a part of the BiPh in the skeleton of the porous material excited with the light having a wavelength of 265 nm supplies electrons to an Re (PPh$_3$) portion having a high electron accepting property. Therefore, it was recognized that the light energy absorbed by the BiPh in the skeleton of the porous material was released from the rhenium complex in the light energy conversion materials (Examples 18 to 19) of the present invention. Furthermore, it was implied that the photo-excited BiPh supplied electrons to the rhenium complex.

Example 20

First 0.50 g of the BiPh-HMM obtained in Synthesis example 1 was put in a reaction container, and heated under an evacuation condition to remove water physically adsorbed in the pore. Thereafter, the reaction container was filled with an argon gas. Then, 50 ml of toluene, and 0.58 ml of titanium isopropoxide were added therein to carryout a reflux process for 1 to 2 hours. Subsequently, the mixture in the reaction container was filtrated to recover powders. The obtained powders were washed with anhydrous ethanol and ion-exchanged water to remove the unreacted titanium isopropoxide from the powders, and thereby BiPh-HMM modified by titanium oxide (TiO$_2$) (Ti-BiPh-HMM) was obtained.

Example 21

First 0.50 g of the BiPh-HMM obtained in Synthesis example 1 was put in a reaction container, and heated under an evacuation condition to remove water physically adsorbed in the pore. Thereafter, the reaction container was filled with an argon gas. Then, 50 ml of anhydrous ethanol and 0.72 g of tantalum chloride were added therein to carry out a reflux process for 1 to 2 hours. Subsequently, the mixture in the reaction container was filtrated to recover powders. The obtained powders were washed with anhydrous ethanol and ion-exchanged water to remove the unreacted tantalum chloride from the powder, and thereby BiPh-HMM modified by tantalum oxide (Ta$_2$O$_5$) (Ta-BiPh-HMM) was obtained.

[Evaluation of Properties of Ti-BiPh-HMM Obtained in Example 20 and Ta-BiPh-HMM obtained in Example 21]

Using the Ti-BiPh-HMM obtained in Example 20 and the Ta-BiPh-HMM obtained in Example 21, the N$_2$ adsorption isotherms, the BJH pore diameter distribution curves, the X-ray diffraction patterns, and the NMR spectra were measured. It was recognized from these measurement results that a semiconductor oxide was supported in the pore in a highly dispersed condition. Furthermore, the changes in the mesopore regular arrangement, organic group arrangement, and siloxane condensation degree by the fixation process were not recognized as compared to those of the BiPh-HMM obtained in Synthesis example 1.

<Measurement of Ultraviolet/Visible Light Diffuse Reflection Spectra and Luminescence Spectra>

Figure 37:
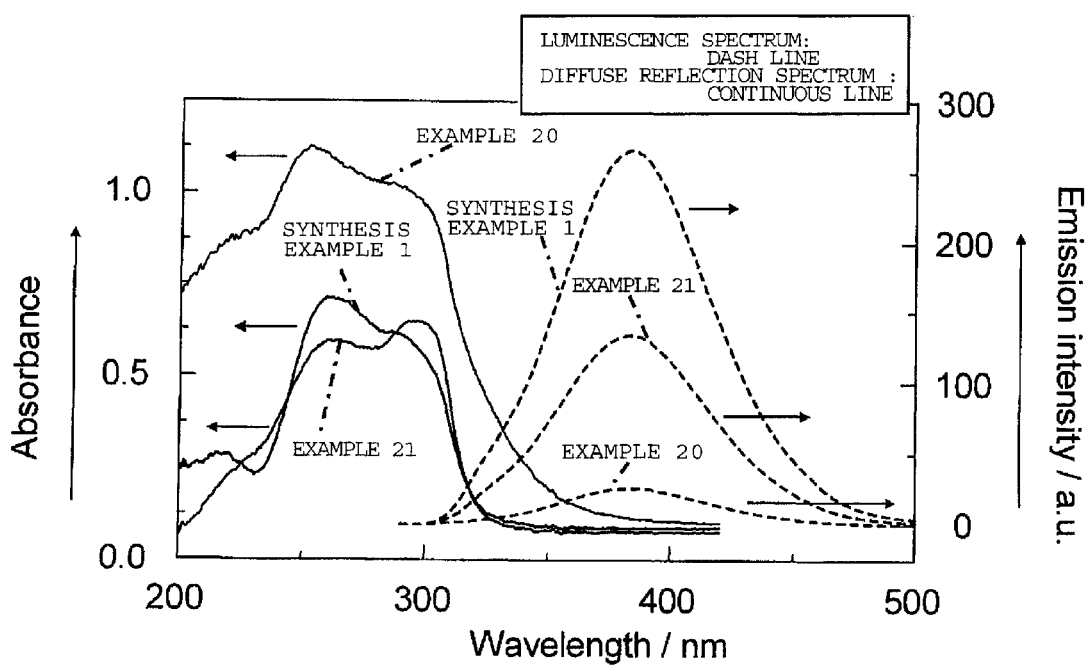
FIG. 37 is a graph showing luminescence spectra and UV/Vis spectra (diffuse reflection spectra) of BiPh-HMM (Synthesis example 1), Ti-BiPh-HMM (Example 20), and Ta-BiPh-HMM (Example 21).

The UV/Vis spectra (diffuse reflection spectra) of the BiPh-HMM obtained in Synthesis example 1, the Ti-BiPh-HMM obtained in Example 20 and the Ta-BiPh-HMM obtained in Example 21 were measured. FIG. 37 is a graph showing the obtained UV/Vis spectra (diffuse reflection spectra). Incidentally, such diffuse reflection spectra are represented in solid lines in FIG. 37.

The luminescence spectra of the BiPh-HMM obtained in Synthesis example 1, the Ti-BiPh-HMM obtained in Example 20 and the Ta-BiPh-HMM obtained in Example 21 were measured. Such measurement was carried out using a sample prepared by dispersing 0.4 mg of each of the BiPh-HMM powders obtained in Synthesis example 1, the Ti-BiPh-HMM powders obtained in Example 20 and the Ta-BiPh-HMM powders obtained in Example 21 in 4 ml of acetonitrile, by passing an argon gas therethrough for 20 minutes, and then by hermetically sealing the resultant mixtures in a container (quartz-made cell). FIG. 37 shows luminescence spectra when excited with the light having a wavelength of 280 nm. Incidentally, such luminescence spectra are represented with dashed lines in FIG. 37.

As apparent from the results shown in FIG. 37, the luminescence peak was observed at 380 nm as the center when the BiPh-HMM obtained in Synthesis example 1 was irradiated with the excitation light having a wavelength of 280 nm. On the other hand, in the Ti-BiPh-HMM obtained in Example 20 and the Ta-BiPh-HMM obtained in Example 21, the luminescence peak by the biphenyl groups in the skeletons was recognized. However, the peak intensity was greatly reduced as compared to the case of the BiPh-HMM. In comparison with the fluorescence quantum yield (excitation light: 280 nm), the fluorescence quantum yield of the Ti-BiPh-HMM (Example 20) was 0.04, and that of the Ta-BiPh-HMM (Example 21) was 0.11, while that of the BiPh-HMM (Synthesis example 1) was 0.20. It was implied from these results that excited electrons formed by photo-excitation were transferred to conduction bands of $TiO_2$ and $Ta_2O_5$, resulting in the reduction in the quantum efficiency because the conduction bands of $TiO_2$ and $Ta_2O_5$ are lower than the LUMO level of the biphenylene molecule.

INDUSTRIAL APPLICABILITY

As described above, according to the present invention, it is possible to provide a light energy conversion material which can advance a light energy conversion reaction with a high efficiency, resulting in the significant improvement in the light energy conversion efficiency, and, further, which can improve the physical stabilities of an electron donor and an electron acceptor to give the light conversion material a sufficient durability. Therefore, the light energy conversion material according to the present invention provides an excellent light energy conversion efficiency, and thus is suitably utilized for the fields of a photocatalyst such as the photoreduction catalyst for $CO_2$ and $H_2$ and a solar battery.

What is claimed is:

1. A method of transferring electrons with a light energy conversion material comprised of a porous material including an electron donor in a skeleton thereof, and an electron acceptor disposed in at least one portion among a pore, the skeleton and the outer circumference of the porous material, wherein the porous material including the electron donor in the skeleton thereof is a silica porous material comprised of silicon atoms chemically bonded with an organic group, the method comprising:

absorbing light energy by the organic group of the silica porous material and transferring electrons excited by the light energy from the organic group of the silica porous material to the electron acceptor, wherein the organic group is the electron donor and is a molecule selected from the group consisting of 1,1-bi-2-naphthol, 1,3-di(N-carvazolyl)propane (DCzPr), 1,4-di(N-carvazolyl)butane (DCzBu), 1,4-diazabicyclo[2,2,2]octane, 2,3-dihydroxy-naphtol, 2,7-dihydroxy-naphthol, 2-naphthol, Cu(2,9-diphenyl-1,10-phenanthroline)$^{2+}$, di(N-carvazolyl)methane (DCzMe), meso-2,4-di(N-carvazolyl)pentane (m-DCzPe), Mg(phthalocyanine)$^{4+}$, N,N,N',N'-tetramethyl-p-phenylenediamine, N,N,N',N'-tetramethylbenzidine, N,N-diethylaniline, N,N-dimethylaniline, N-ethyl-carbazole (Et Cz), Rh$_2$(1,3-diisocyanopropane)$_4^{2+}$, Ru(2,2'-bipyridine)$_3^{2+}$, Tetrakis(dimethylamino)ethylene (TDAE), trans-1,2-di(N-carvazolyl)cyclobutane (DCzCBu), Zn(tetra(N-methylpyridinium)porphyrin)$^{4+}$, a Zn porphyrin complex, Zn(tetraphenylporphyrin), Zn(octaethylporphyrin), a Zn phthalocyanine complex, anthracene, indene, oxadiazole, oxazole, quadricyclane, diazabicyclooctane, diphenylethylene, triethylamine, triphenylmethane, trimethoxybenzene, naphthalene, norbornadiene, hydrazone, pyrene, phenanthrene, phenothiazine, perylene, methoxynaphthalene and biphenyl.

2. The method of claim 1, wherein the electron acceptor is at least one kind selected from the group consisting of compounds represented by the following general formula (3):

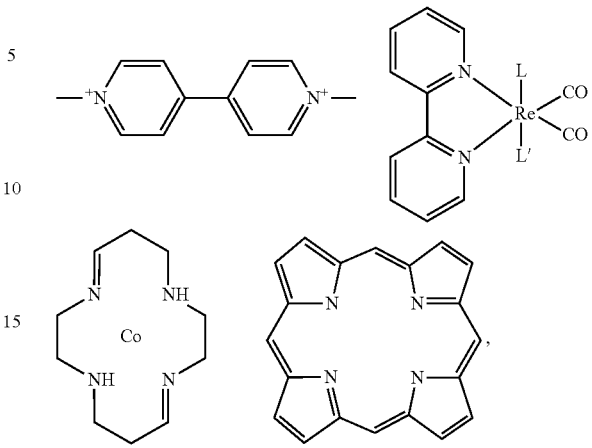

(3)

Cr(2,2'-bipyridine)$_3^{2+}$, Cr(2,2'-bipyridine)$_3^{3+}$, Cr(CN)$_6^{3-}$, Fe(CN)$_6^{4-}$, Fe$^{3+}$, N,N-dimethylaniline, Pt$_2$ (P$_2$O$_5$)$_4$H$_8^{4-}$, methyl p-cyanobenzoate, p-dicyanobenzene, p-dinitrobenzene, p-benzoquinone, ReCl$_8^{2-}$, Rh$_2$(1,3-diisocyanopropane)$_4^{2+}$, Ru(2,2'-bipyridine)$_3^{2+}$, trans-stilbene, UO$_2^{2+}$, a Zn porphyrin complex, Zn(tetraphenylporphyrin), Zn(octaethylporphyrin), Zn phthalocyanine, acetophenone, anthracene, an osmium(II) complex, chloranil, cyanoanthracene, cyanonaphthalene, dimethylaniline, dicyanoanthracene, dicyanonaphthalene, dimethylbicyclohepta-2,5-diene-2,3-dicarboxylate, tetracyanoanthracene, tetracyanoethylene, triphenylpyrylium tetrafluoroborate, naphthalene, nitrobenzene, viologen, phenanthrene, fullerene C60, fullerene C60-μ-oxodimer(C120O), fullerene C70, benzophenone, methylviologen, methoxyacetophenone, oxygen and an aromatic vinyl polymer.

3. The method of claim 1, wherein the porous material has a periodic structure with an interval of 5 nm or less based on the regular arrangement of the organic groups.

4. The method of claim 1, wherein the porous material has the pore with a central pore diameter of 1 nm to 30 nm.

5. The method of claim 1, wherein the porous material has one or more peaks at a diffraction angle corresponding to a d value of 1 nm or more in an X-ray diffraction pattern.

6. The method of claim 1, wherein the electron acceptor is at least one kind selected from the group consisting of a quinone compound, an aromatic compound having a vinyl group, an aromatic compound having a cyano group, an aromatic compound having a nitro group, a nitrogen-containing aromatic compound, an organic compound having a dicyanomethylene group, a molecular metal complex containing an organic compound having a dicyanomethylene group as a ligand, an organic compound having a cyanoimino group, a molecular metal complex containing an organic compound having a cyanoimino group as a ligand, fullerene, a carbon nanotube, a metal complex having a nitrogen-containing organic ligand, a metal complex having a cyclic ligand, a metal complex salt, a metal ion and a metal oxide.

7. The method of claim 1, wherein the silica porous material has a skeleton structure of X—Si—O, X being the organic group that is chemically bound to the silicon atoms.

* * * * *